United States Patent [19]
Takemasa et al.

[11] Patent Number: 5,986,981
[45] Date of Patent: Nov. 16, 1999

[54] DISK REPRODUCING APPARATUS HOUSING A PLURALITY OF DISKS

[75] Inventors: Kaoru Takemasa; Masami Fujimoto; Susumu Yoshida; Kenjiro Ido; Toru Suzuki, all of Kawagoe, Japan

[73] Assignee: Pioneer Electronic Corporation, Japan

[21] Appl. No.: 08/885,908

[22] Filed: Jun. 30, 1997

[30] Foreign Application Priority Data

Jul. 4, 1996 [JP] Japan ................................. 8-175250

[51] Int. Cl.⁶ ........................... G11B 17/22; G11B 33/02
[52] U.S. Cl. ............................................. 369/37; 369/77.1
[58] Field of Search .................................. 369/34, 36, 38, 369/77.1, 178

[56] References Cited

U.S. PATENT DOCUMENTS

| | | | |
|---|---|---|---|
| 2,096,718 | 10/1937 | Hokanson | 369/34 |
| 5,099,466 | 3/1992 | Kimura et al. | 369/36 |
| 5,384,760 | 1/1995 | Kumakura | 369/38 |
| 5,508,994 | 4/1996 | Nakamichi et al. | 369/192 |
| 5,555,239 | 9/1996 | Takai et al. | 369/192 |

Primary Examiner—David L. Ometz
Assistant Examiner—Tod Kupstas
Attorney, Agent, or Firm—Evenson, McKeown, Edwards & Lenahan, P.L.L.C.

[57] ABSTRACT

In a disk reproducing apparatus a plurality of disks each carrying information recorded therein are inserted through an insertion opening and arrayed and held in a predetermined direction and a desired disk is selected for reproduction from the plurality of disks arrayed and held therein. The disk reproducing apparatus comprises a disk holding device including a plurality of trays arranged for holding thereon the plurality of disk respectively, a disk carrying device which carries the disk between the insertion opening and the tray, and a disk reproducing device which is carried to be positioned outside an area where a disk held by the disk reproducing device exists when the disk is not being reproduced and positioned that at least a portion is inside the area where the disk exists, when the disk is being reproduced. The disk carrying device and the disk reproducing device are juxtaposed in a direction in which disks are arrayed when the disk is not being reproduced. With this feature, minimization of the entire size of the apparatus and simplification of the construction are realized.

4 Claims, 30 Drawing Sheets

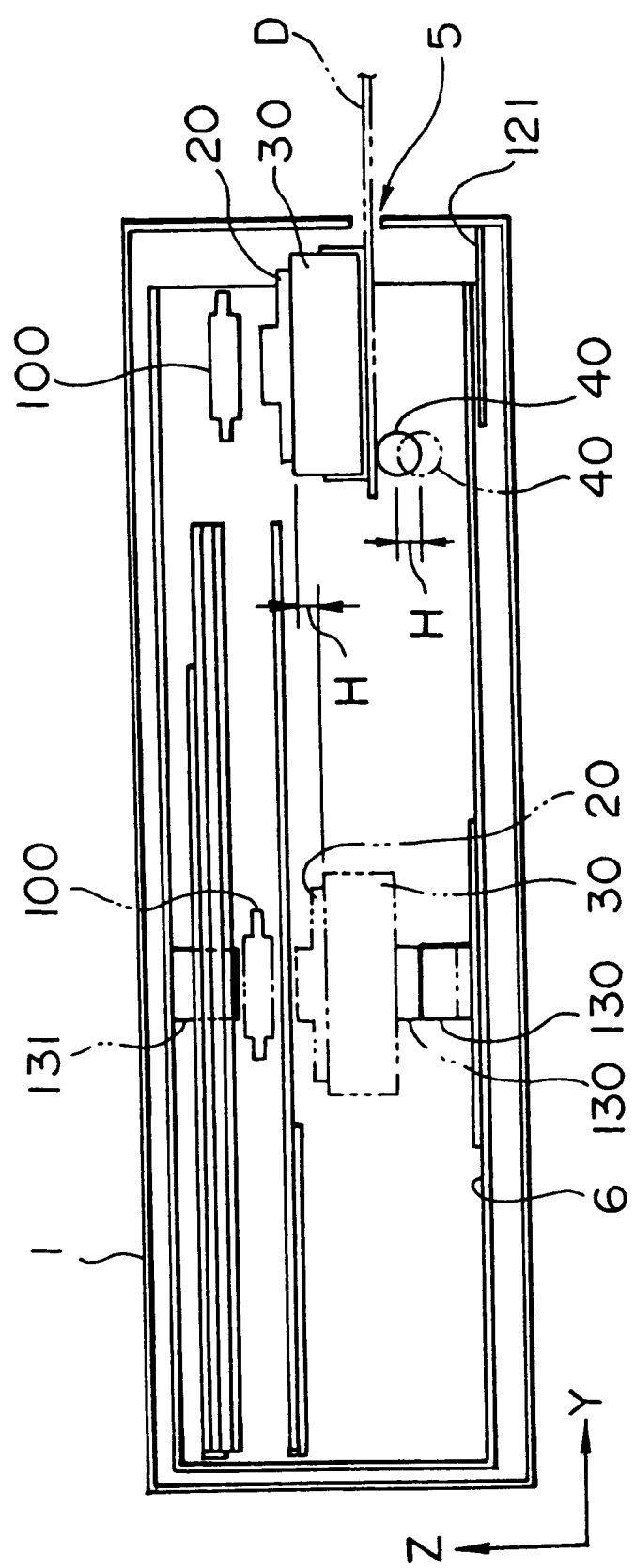

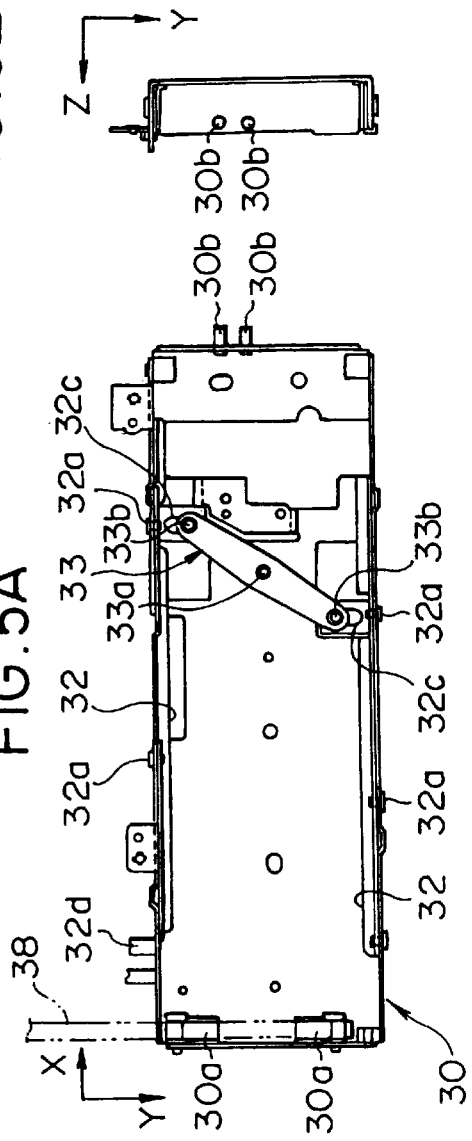
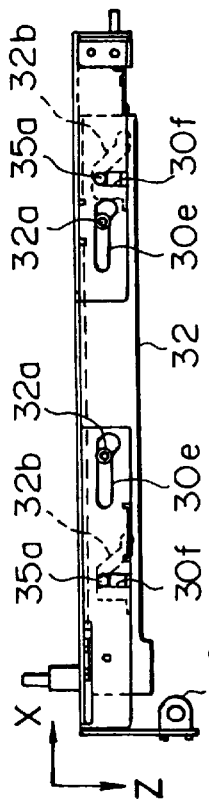
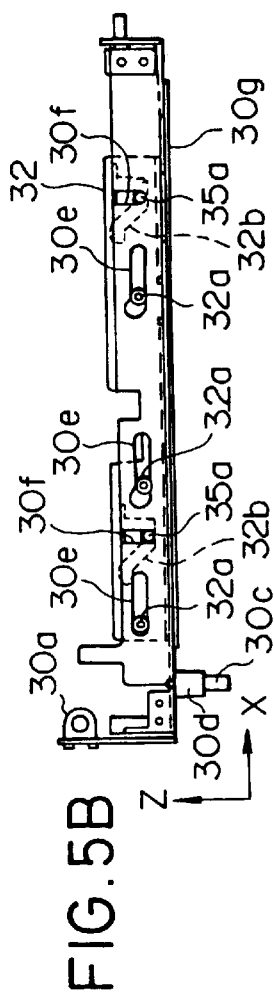
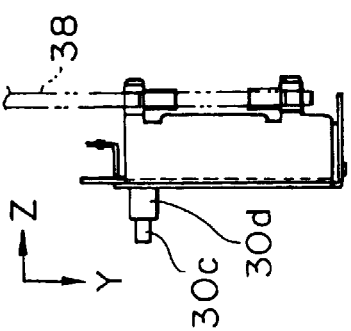

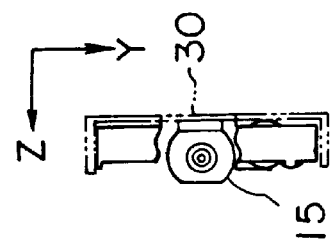
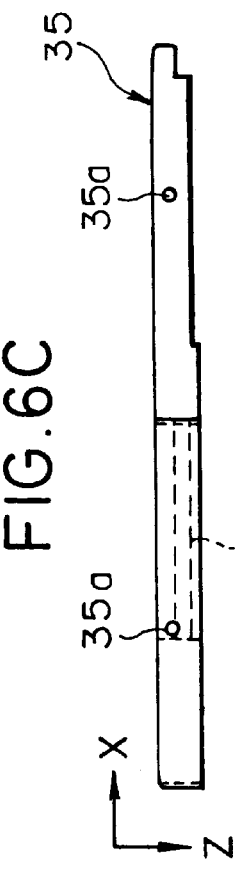
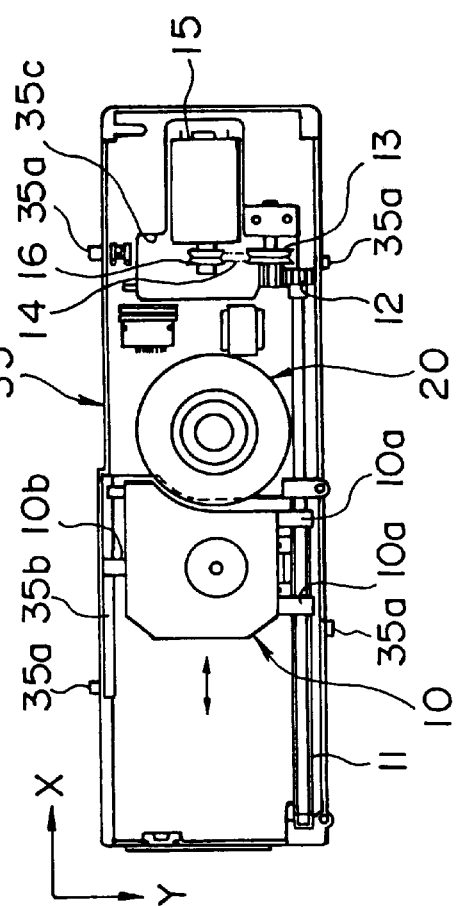
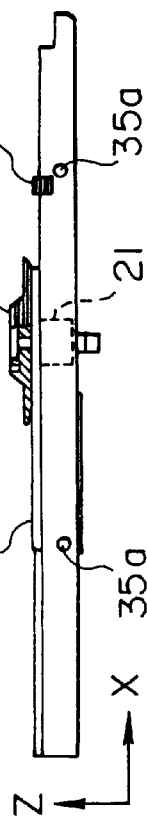
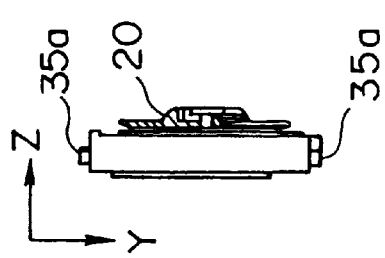

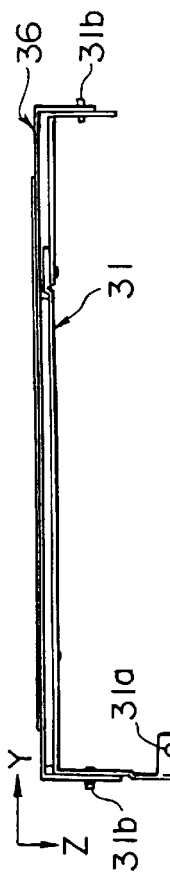
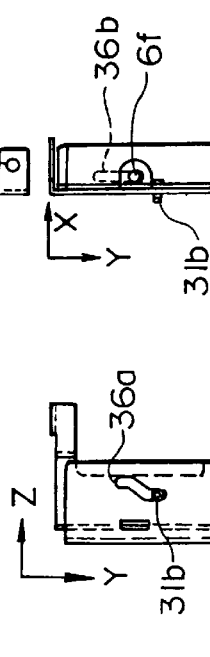
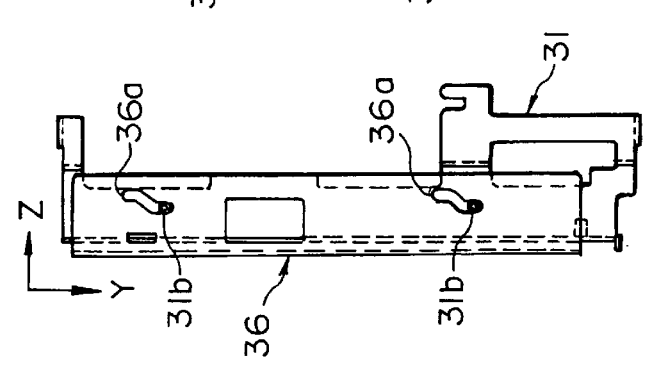
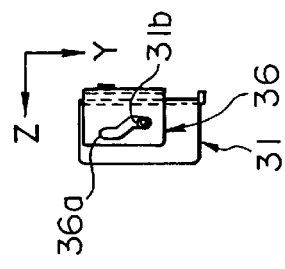
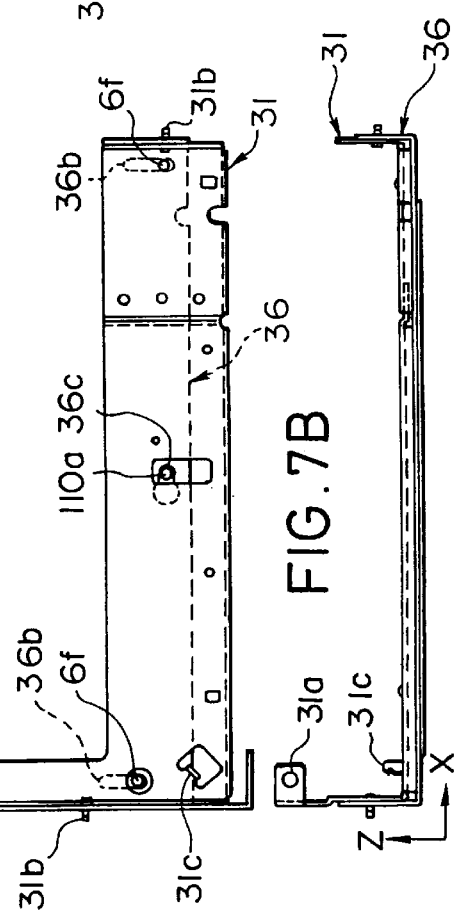

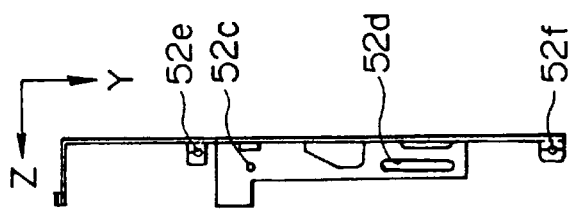
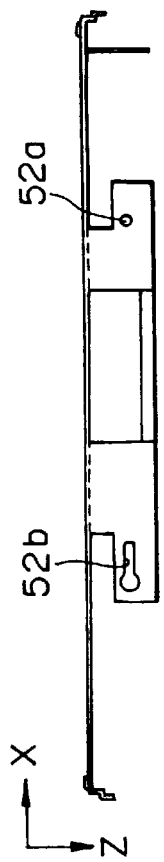
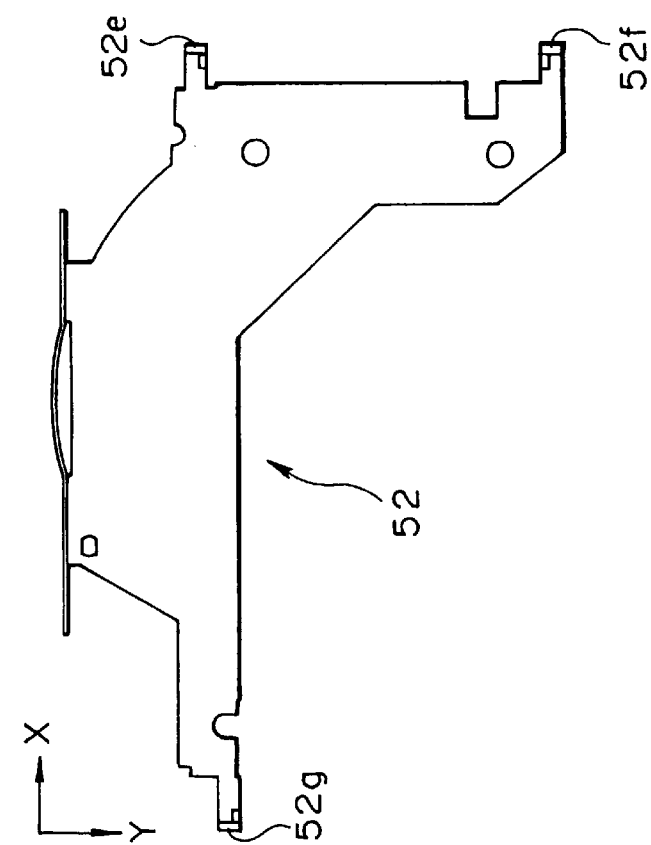
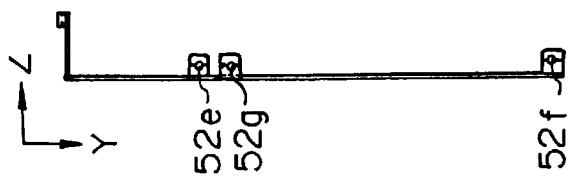

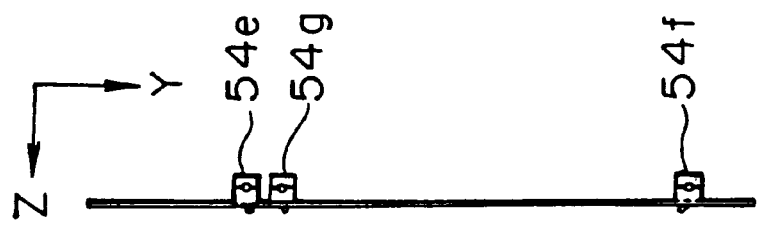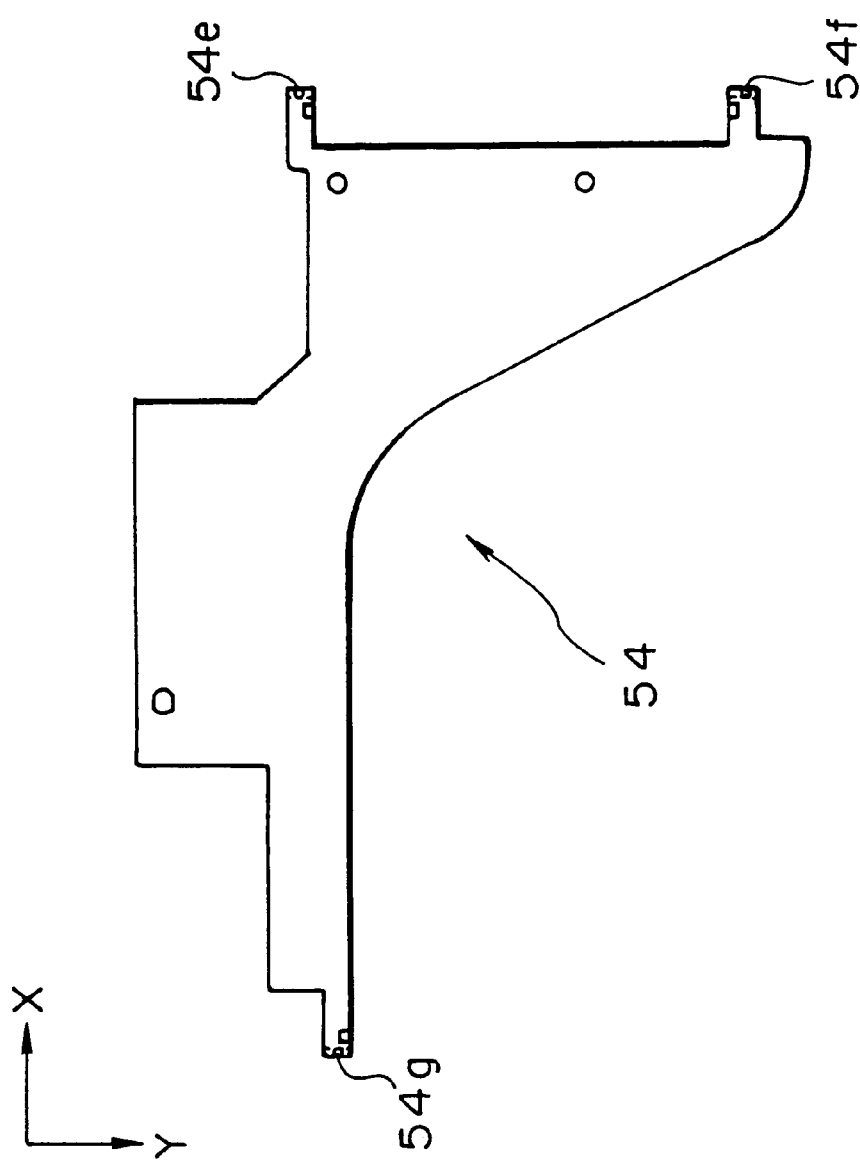

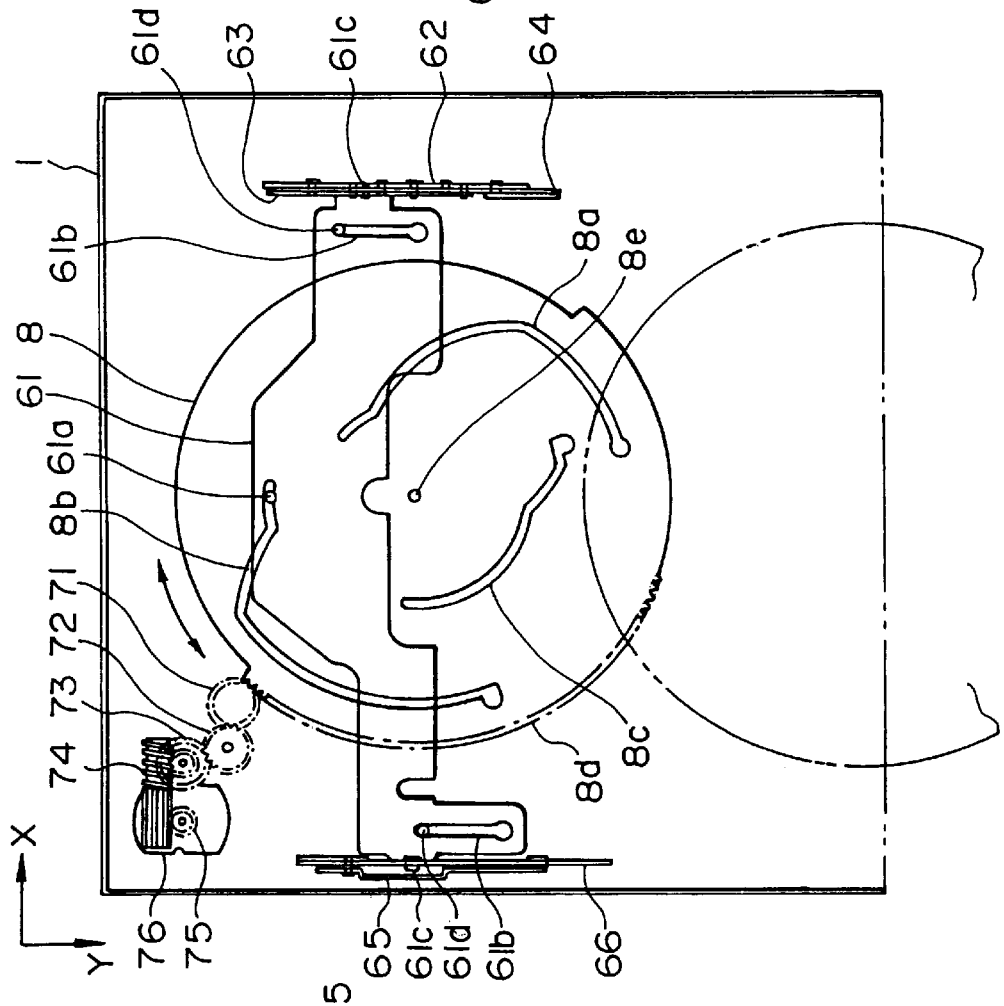

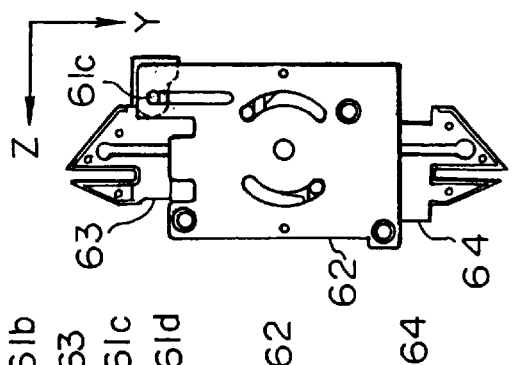
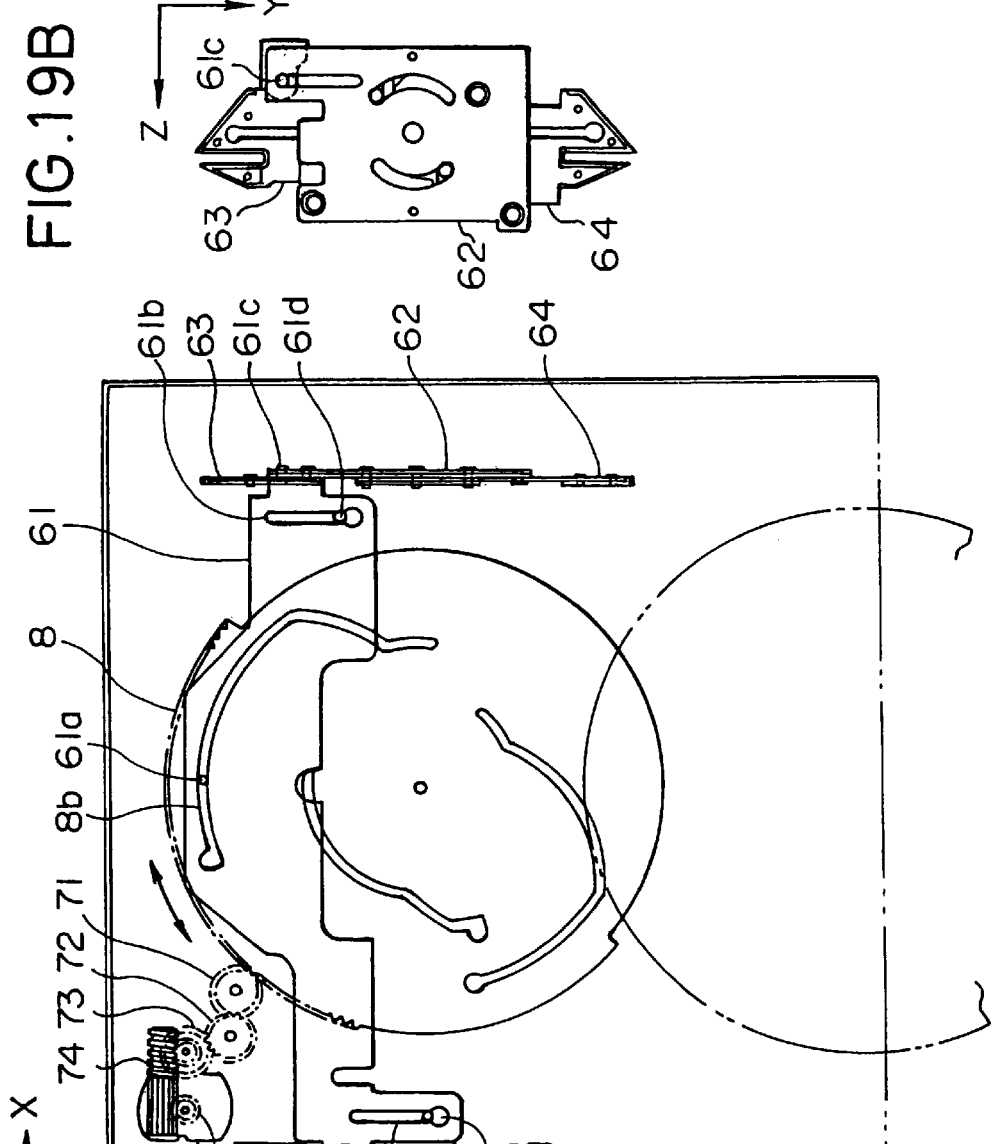
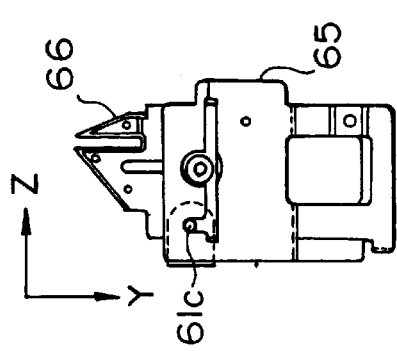

DISK REPRODUCING APPARATUS HOUSING A PLURALITY OF DISKS

BACKGROUND OF THE INVENTION

1. Field of the Invention

The present invention relates to a disk reproducing apparatus which can contain therein a plurality of information recording disks in an array and successively play back those recording disks, and more particularly to a disk reproducing apparatus for motor vehicles which is installed in a dashboard of the motor vehicle.

2. Description of Related Art

Disk players of a type that contains therein a plurality of disks in an array and can reproduce a desired disk among the disks housed are known. One such disk player uses a magazine or the like for housing disks, provided separately from a main unit of the player and, for example installed in a trunk space of a car.

In this type of disk player, a main unit of the disk player is installed in a dashboard of a car and is linked by wires to a magazine which is in the trunk space. In this case, playback of a disk or other similar operations can be performed through an operation panel provided on a front face of the main unit of the player. However, when it is desired to change a disk with another one, it is required at first to open a trunk lid and take out the magazine mounted at the back of a side face or a floor face of the trunk space and subsequently to change the disk with another one.

There also is known a type of disk player in which a magazine can freely be set or removed into or from a main unit of a disk player mounted in a dashboard of a motor vehicle.

In this type of disk player, a magazine projects frontwards from a main unit of the disk player when replacing a disk with another one, so that it is necessary to select a position sufficiently away from a gear shift knob or the like of the car when installing the main unit of the disk player. Thus, the selection of the installation position of the player's main unit is subjected to some restrictions.

Also among disk players of the type that uses this detachable type of magazine, there is a type of disk player in which a magazine set in a main unit of the player is split into two pieces in the vertical direction to select a desired disk to be reproduced, and a reproducing device including a pickup or the like is removed into a space formed between the separated pieces (reference is directed, for example, to Japanese Patent Kokai No. 235249/1991). However, the mechanism for separating magazines and selecting a disk employed herein uses a plurality of swinging arms or the like, which makes the construction rather complicated.

OBJECT AND SUMMARY OF THE INVENTION

The present invention has been made to solve the problems relating to the conventional technology, and it is an object of the present invention to provide a disk reproducing apparatus which enables simplification of the construction and minimization in size of the apparatus as a whole, and also insures a highly flexible selection of a position for mounting it, for instance, in a dashboard of a motor vehicle.

In the disk reproducing apparatus according to the present invention, a plurality of disks each carrying information recorded therein are inserted through an insertion opening and arrayed and held in a predetermined direction, until a desired one among the plurality of disks arranged and stored is selected for reproduction. The disk holding device includes a plurality of trays arrayed for holding the plurality of disks respectively, a disk carrying device for carrying disks between the insertion opening and the trays, and a disk reproducing device which is carried to be positioned outside the area occupied by disks held by the disk holding device when the disk is not being reproduced, and positioned such that at least a portion thereof is inside the existence area of the disk when the disk is to be reproduced. The disk carrying device and the disk reproducing device are juxtaposed in a direction in which the disks are arrayed when the disks are not being reproduced. By this feature, components are positioned to be close to each other in the front-to-rear direction of the apparatus, and a size reduction of the apparatus as a whole is enabled.

BRIEF DESCRIPTION OF THE DRAWINGS

FIG. 3 is a side view showing arrangement of components in the disk reproducing apparatus according to the present invention;

FIGS. 4A and 4B are views showing a disk carrying device according to the present invention respectively, in which FIG. 4A is a plan view, and FIG. 4B is a front view;

FIGS. 5A to 5E are views each showing a carriage according to the present invention, and FIG. 5A is a plan view, FIG. 5B is a front view, FIG. 5C is a rear view, FIG. 5D and FIG. 5E are side views.

FIGS. 6A to 6E are views each showing a reproducing device carrier frame according to the present invention, in which FIG. 6A is a plan view, FIG. 6B is a front view, FIG. 6C is a rear view, FIG. 6D and FIG. 6E are side views;

FIGS. 7A to 7E are views each showing a carriage carrier frame according to the present invention, in which FIG. 7A is a plan view, FIG. 7B is a front view, FIG. 7C is a rear view, and FIG. 7D and FIG. 7E are side views;

FIGS. 13A and 13B are views each showing a disk holding device according to the present invention, in which FIG. 13A is a rear view, while FIG. 13B is a side view;

FIGS. 14A to 14D are views each showing a lower holder according to the present invention, in which FIG. 14A is a plan view, FIG. 14B and FIG. 14C are side views, and FIG. 14D is a rear view;

FIGS. 17A and 17B are views each showing an upper holder according to the present invention, in which FIG. 17A is a plan view, and FIG. 17B is a side view;

FIGS. 18A to 18C are views each showing a state of a tray separating device according to the present invention before start of its operation, in which FIG. 18A is a plan view, and FIG. 18B and FIG. 18C are side views;

FIGS. 19A to 19C are views each showing a state of the tray separating device according to the present invention, in which FIG. 19A is a flat view, while FIG. 19B and FIG. 19C are side views;

DETAILED DESCRIPTION OF THE PREFERRED EMBODIMENTS

Next detailed description is made for embodiments of the disk reproducing apparatus according to the present invention with reference to the attached drawings.

The disk reproducing apparatus comprises, for instance, a housing 1, adapted to be inserted into a mounting port formed in a dashboard (not shown herein) of a car and fixed to a bracket or the like supporting it, and a front panel 2 exposed in a front section of this housing, namely to a chamber inside the car.

Figure 1:
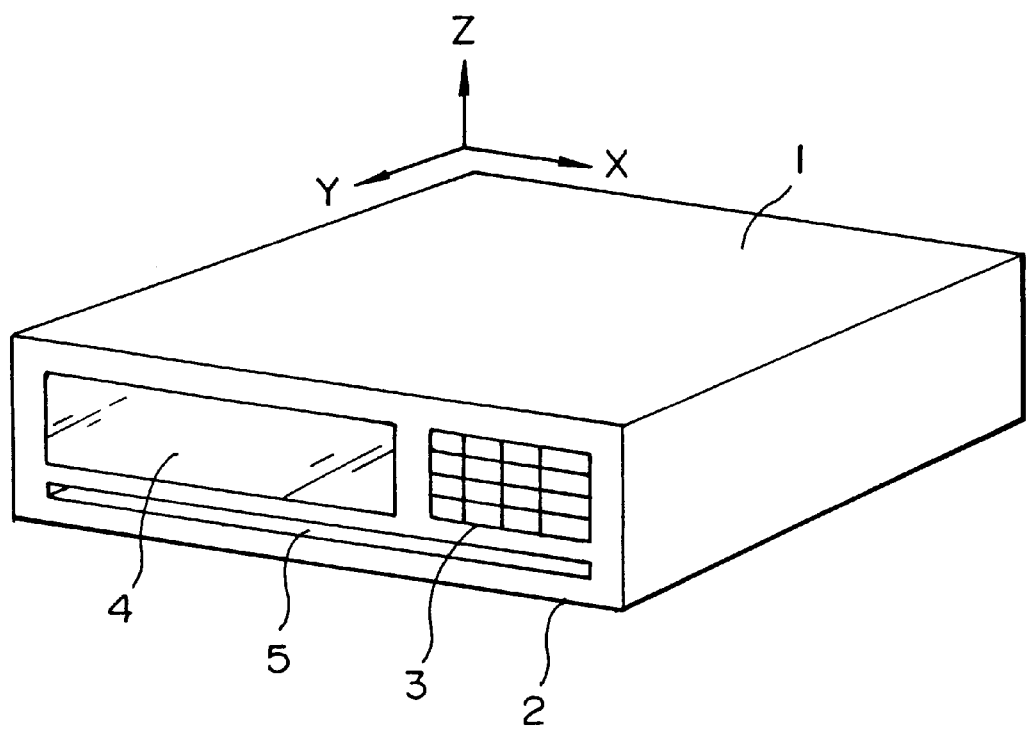
FIG. 1 is a perspective view showing appearance of a disk reproducing apparatus according to the present invention.

As shown in FIG. 1, arranged on the front panel 2 forming the front section of the housing 1 are an operating section for providing controls such as instructions for reproduction and a display section each provided in an upper section thereof. An insertion opening 5, into which a disk is inserted to be reproduced, is provided under the components above, and is closed with a blocking cover (not shown) swingingly or slidably attached there when the disk is not being reproduced.

A main chassis 6 is provided with a vibration-preventing rubber piece 1a (FIG. 2) as a vibration-preventing mechanism inside the housing 1, and various types of mechanisms are provided on this main chassis.

Figure 2:
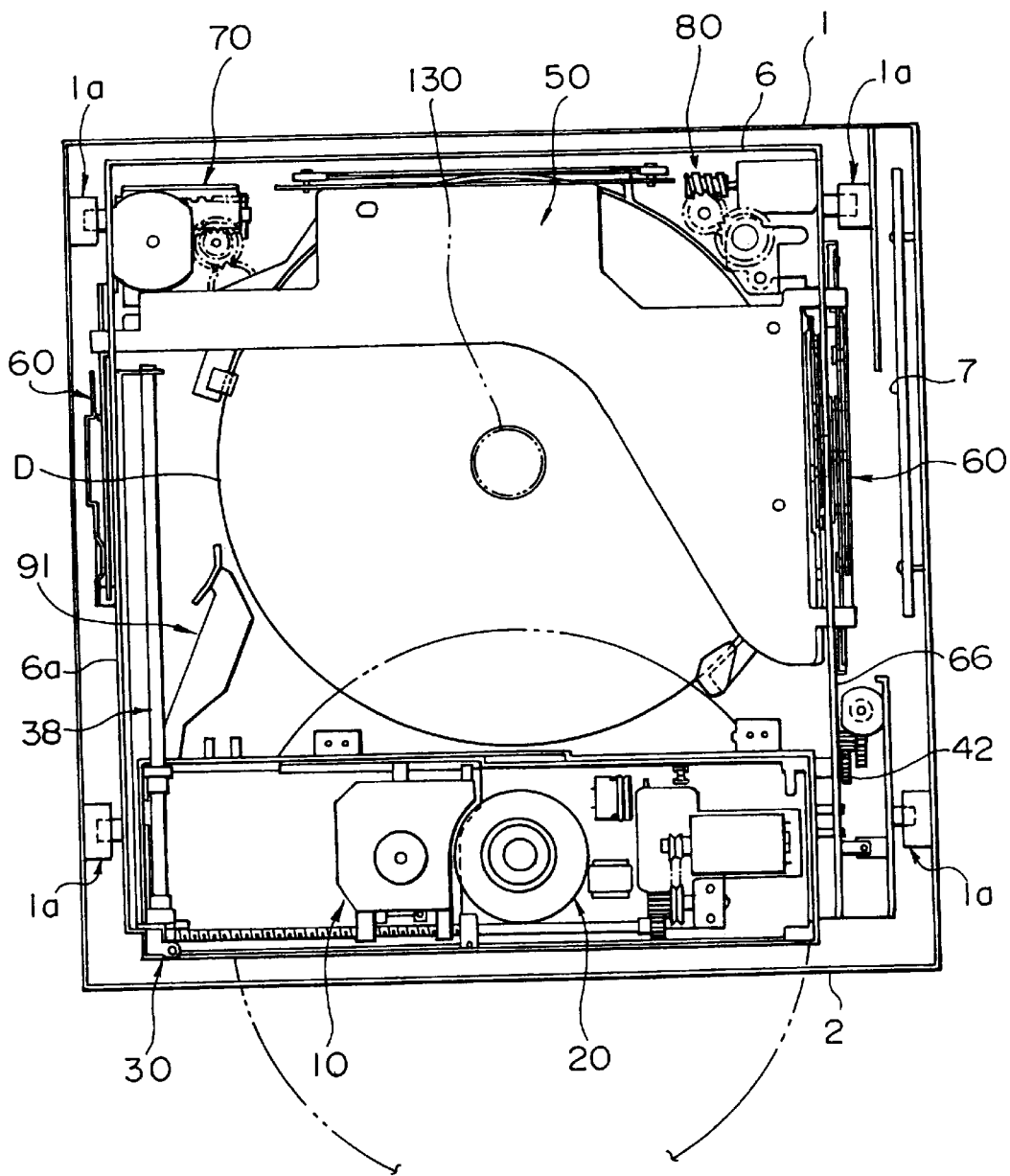
FIG. 2 is a flat view showing arrangement of components in the disk reproducing apparatus according to the present invention.
Figure 4A:
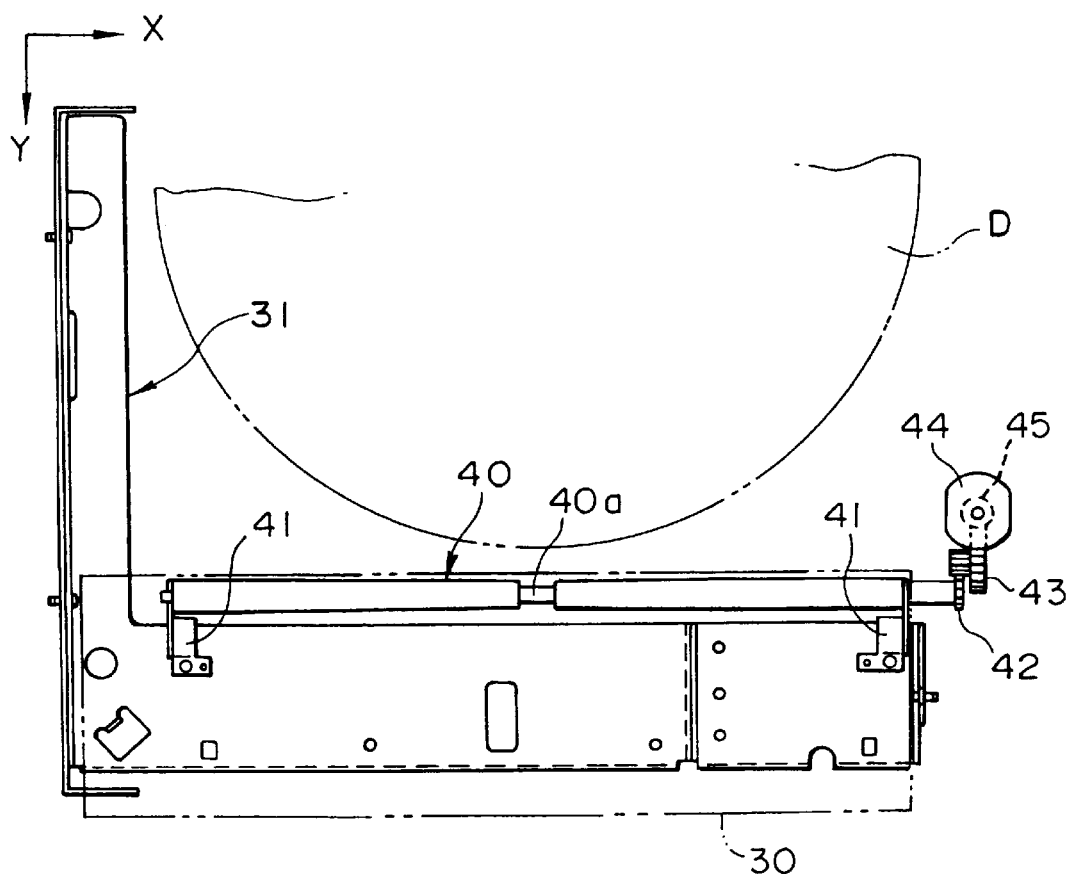
Figure 4B:
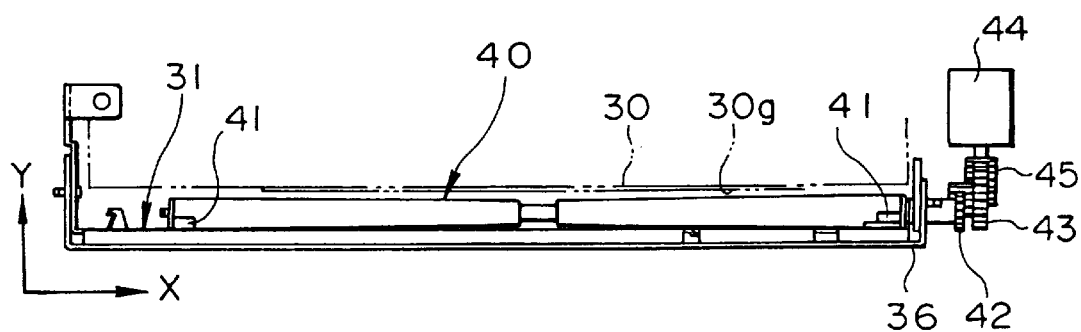

As shown in FIG. 2, provided on the main chassis are a carriage 30 carrying thereon a reproducing device comprising a pickup 10 and a turn table 20 or the like, each for reproducing a disk so that the carriage 30 can reciprocate back and forth (in the Y-axial direction) to be positioned at a rear position when the disk is to be reproduced and at a front position when the disk is not being reproduced. Also positioned in a rear zone of the main chassis 6 is a disk holding device 50 accommodating therein a tray 53 or the like for maintaining thereon a plurality of disks (4 disks in this case) arrayed in the vertical direction (in the Z-axial direction). The disk holding device 50 can be moved with a lift mechanism having a pantograph mechanism or the like in the vertical direction (in the Z-axial direction). Provided along the side face sections 6a, 6b is a tray separating device 60 constituting a portion of a disk selecting device for selecting a desired disk to be reproduced and separating the disk from other disks so that the tray separating device can reciprocally move back and forth. Further in the outer side of the side face section 6b of the main chassis is provided a printed circuit board 7 with control devices or the like formed thereon in parallel to the side face, and the printed circuit board 7 is fixed to an inner wall of the housing 1.

Also as shown in FIG. 3, a roller 40 constituting a portion of the disk carrying device (described below) is provided under the carriage at a position where the disk is not reproduced so that it extends from right to left (in the X-axial direction). It should be noted that, as for the carriage 30, turn table 20, and clamping device 100, a solid line in the figure indicates that each of the components is in the standing-by state and a two-dot chain line indicates that the component is at a position for reproduction.

Next detailed description is made for each of the various types of mechanism described above.

At first, description is made for the disk carrying device for carrying a disk inserted from the insertion opening 5 of the housing 1 to a disk storage position inside the housing 1, namely to a position of a tray 53, and also for carrying, when a disk is taken out, the disk from the storage position to the insertion opening.

As shown in 4A, 4B, a pair of cantilever shaped plate springs 41 are fixed at a position close to two edges of an upper surface of an approximately L-shaped carriage carrying frame 31, and a shaft 40a of the roller 40 is rotatably supported in a bearing hole formed in a free edge section of this plate spring 41. A taper-formed counter-cylindrical member made of resin with the external diameter increasing from a central position of the shaft to the two edges thereof is engaged with the shaft 40a of the roller 40 from the outside. Also a gear 42 is attached to one edge section of the shaft 40a, and this gear 42 engages via an intermediate gear 43 provided on a side face 6b of the main chassis 6 with a worm 45 attached to a motor as a source of driving force. On the other hand, above the roller 40, when a disk is not being reproduced (or reproduction of a disk is paused), a rear section of a bottom surface of the carriage 30 is positioned outside of an area occupied by the disks arrayed and stored therein. Also in the non-reproduction state, the carriage 30 and roller 40 are positioned so that they are overlaid on each other in the direction of disk array. As positioned as described above, a depth of the apparatus can be shortened, which in turn enables size reduction of the apparatus. Further, a smoothing film 30g made of resin is adhered to a bottom surface of the carriage as described above. Accordingly, in the non-reproduction state, a gap with the width maximum at a central section in the right and left direction (Y-axial direction) and becoming narrower toward both edges thereof is formed between the roller 40 and the smoothing film 30g. In the configuration, when the roller 40 is rotated by the motor 44, a disk inserted from the insertion opening 5 is carried inward with the peripheral area held between the roller 40 and the smoothing film 30g, and when the roller 40 is rotated in the reverse direction, the disk is carried to the insertion opening. The gap has a form like a wedge with the width narrower at the two edges thereof, so that a disk is carried to a disk storage position at a center of the roller being centered, and also is accurately carried to a center of the insertion opening 5.

There is provided a disk carrying device for carrying a disk with the roller 40, smoothing film 30g or the like described above to a disk storage position (tray) and also for carrying out, when the disk is to be taken out, from the storage position to the insertion opening.

Also there is provided a driving device for driving the disk carrying device with the gear 42, intermediate gear 43, worm 45, and motor 44 described above.

Next description is made for the carriage 30 carrying thereon the pickup 10, turn table 20, or the like for playing back a disk as well as for a carriage lifting device for reciprocally moving the carriage 30 up and down.

As shown in FIG. 5A to FIG. 5E, the carriage 30 has a form like a box, which is a rectangle when viewed from the top with its top surface open. A reproducing device carrier frame 35 for carrying thereon a reproducing device comprising the pickup 10 and turn table 20 (each described later) is accommodated inside the internal space thereof. Provided on one side face of the carriage 30 is a pair of guide shaft insertion members 30a through which a guide shaft 38 guiding movement of the carriage 30 in the back-and-forth direction, and also provided on the opposite side face are two pins 30b each projecting in the horizontal direction, and these two pins 30b are inserted into a stripe of guide hole 6c (Refer to FIG. 8) extending in the back-and-forth direction on the side wall 6b of the main chassis 6.

An engagement pin 30c which is engaged with a long hole 37c of a swinging arm 37 for driving a carriage, as described later, and projects downward, is provided in one side section of the bottom surface of the carriage 30, and a rotatable rotary ring 30d is engaged with this engagement pin 30c from the outside.

Also on side walls before and after the carriage 30, two guide long holes 30e each extending in the horizontal direction are formed respectively, and also two longitudinal long holes 30f each having the upper edge opened, are formed on the said walls respectively. Slide plates 32 are provided along the inner side of these front and rear wide walls, and the pins planted on these slide plates 32 are slidably engaged in the guide long holes 30e respectively. Also on these slide plates 32, cam holes 32b effecting in directions opposite to each other are formed, and a pin 35a projecting from the reproducing device carrying frame 35 is inserted into this cam hole 32b (Refer to FIG. 6A to FIG. 6E). This pin 35a is also inserted into and passed through the longitudinal long hole 30f and can move up and down.

Also these front and rear slide plates 32 are linked to each other by a joint link 33 slidably provided around a supporting shaft 33a provided on a bottom surface of the carriage and are operated so that the slide plates 32 move to the right and to the left (in the X-axial direction) respectively. It should be noted that, in the joint section, the pins 33b of the joint link 33 are engaged in engagement holes 32c of the slide plates 32 respectively. For this reason, when rightward and leftward forces are applied to U-shaped engagement pieces 32d provided on an edge section of the rear slide plate 32, the front and rear slide plates 32 slide in the opposite directions respectively, and if the engagement piece 32d is moved in a direction reverse to the X-axial direction, the pin 35a inserted through the cam hole 32b, namely the reproducing device carrier frame 35 is raised upward along the longitudinal long hole 30f. On the contrary, if the engagement piece 32d is moved in the X-axial direction, the pin 35a, namely the reproducing device carrier frame 35 is moved downward.

As shown in FIG. 6, the reproducing device carrying frame 35 carries thereon the pickup 10 for reading information recorded in a disk, the turn table 20 for carrying and rotating a disk, the spindle motor 21 as a source of driving force, and a feed screw 11 for moving the pickup 10 in the right and left direction (X-axial direction), namely in a direction parallel to a recording surface of a disk, and other related components. The pickup 10 has two female screw sections 10a each projecting from a front edge thereof engaged with the feed screws 11 and also have an engagement piece 10b projecting from a rear edge section thereof slidably carried on a guide groove 35b formed on the rear side wall of the carrier frame 35. Also the feed screw 11 is rotatably supported by the carrier frame 35, and the gear 12 is engaged with an edge section thereof. This gear 12 is also engaged with gear teeth of a gear 13 with a pulley slidably supported by the carrier frame 35. The gear teeth section of this gear 13 with a pulley is formed with two sheets of gear to realize scissors gear construction to eliminate backlash. A motor as a source of driving force is fixed to a bottom surface of the carriage 30, and a pulley 16 engaged with a spindle of this motor 15 and a gear 13 with a pulley are linked to each other through an open hole 35c of the carrier frame 35. As described above, heavy components such as the motor 15 or the like are fixed to the carriage 30, the components can be moved up and down together with the reproducing device carrier frame 35 to reduce a weight, and as a result a load to the source of driving force can be reduced. With the construction as described above, reciprocal movement of the pickup 10 is realized in association with the motor 5. Namely a pickup driving device for moving the pickup 10 in the radial direction along a recording surface of a disk comprises the motor, pulley 16, rubber belt 14, gear 13 with a pulley, gear 12, feed screw 11, and female screw section 10a.

A carriage carrier frame 31 having an approximately L-shaped form when viewed from the top (as shown in FIG. 7A to FIG. 7E) is arranged under the carriage 30. Under this carriage carrier frame 31, a cam plate 36 also having a similar L-shaped form is provided.

Provided in a side of the carriage carrier frame 31 are a pair of guide shaft mounting holes 31a so that the holes face to each other in the back-and-forth direction (in the Y-axial direction), and a guide shaft 38 for guiding the carriage 30 back and forth is fixed at a position opposite to the mounting holes 31a.

For this reason, the carriage 30 and carriage carrier frame 31 are not moved relatively to each other in the vertical direction (in the Z-axial direction). Rather, they are removed relatively to each other back and forth (in the Y-axial direction); or in other words the Y carriage 30 can move reciprocally in the direction.

Figure 8:
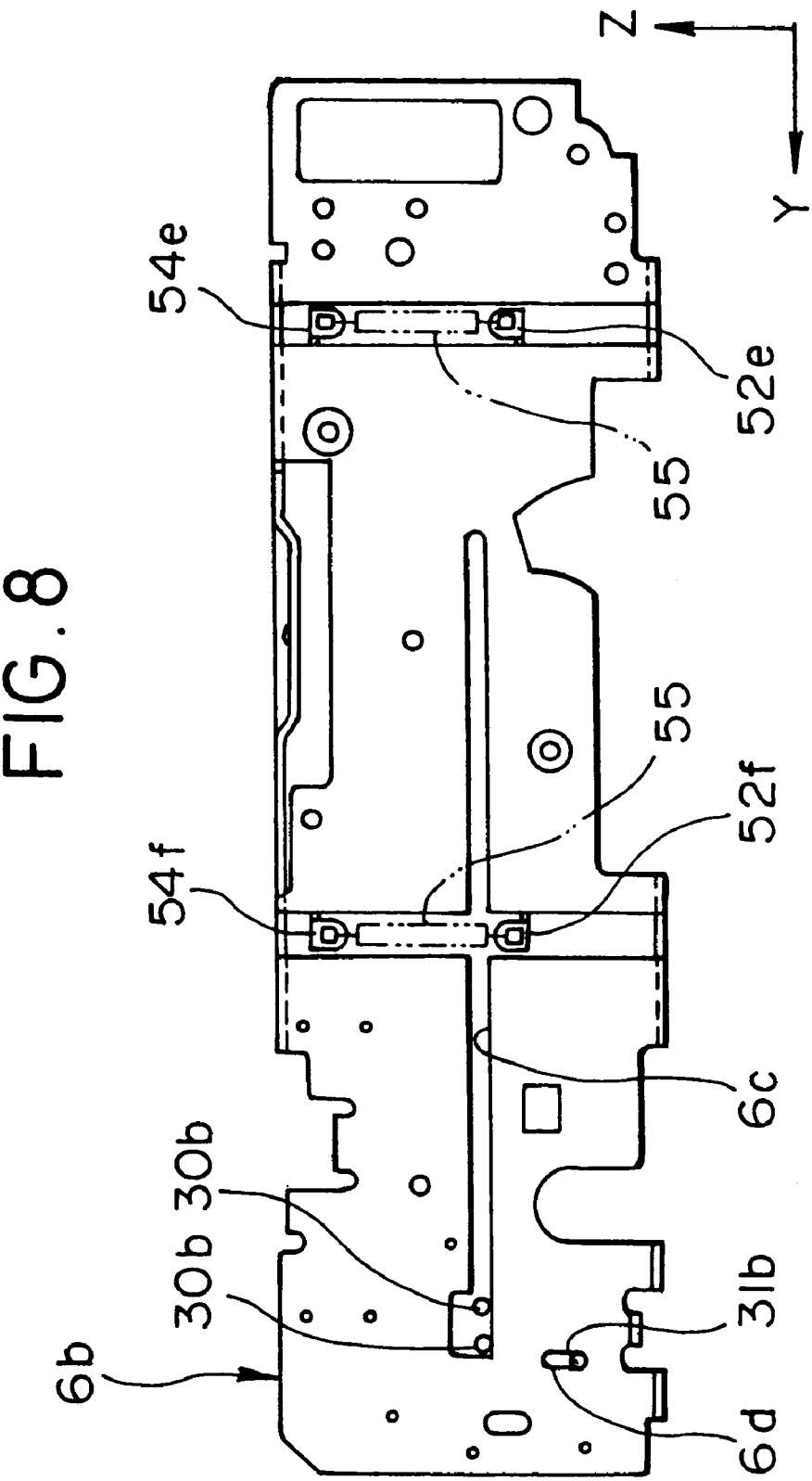
FIG. 8 is a side view showing a main chassis according to the present invention.
Figure 9:
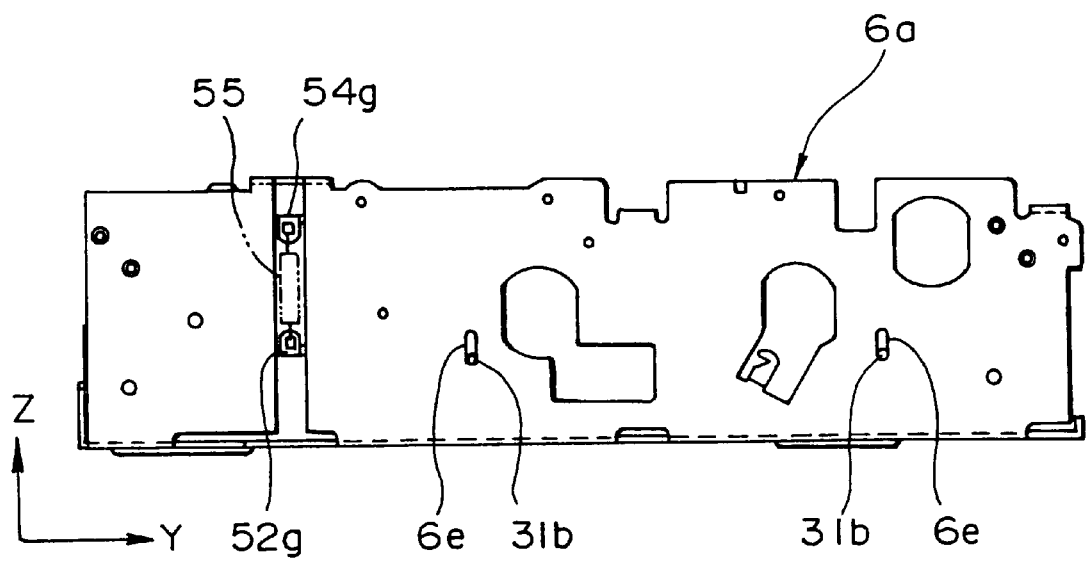
FIG. 9 is a side view showing the main chassis according to the present invention.

Also two pieces of pin 31b are provided on one side wall of the carriage carrier frame 31 and one piece of pin 31b on the other side wall thereof each projecting in the horizontal direction, and bottom surfaces of these pins 31b are positioned under the carriage carrier frame 31, and are inserted into cam holes 36a of the cam plate 36 with the side wall positioned outside the side walls of the carriage carrier frame 31. Further, as shown in FIG. 8 and FIG. 9, these pins 31b are inserted into longitudinal long holes 6e, 6d formed on side walls 6a, 6b of the main chassis respectively so that the pins 31b can move only in the vertical direction.

For the reasons as described above, the cam plate 36 can be moved back and forth (in the Y-axial direction), and the carriage carrier frame 31 is moved up and down (in the Z-axial direction).

It should be noted that the cam plate 36 has the guide long hole 36b with a pin 6f planted on a bottom surface of the chassis 6 inserted therethrough and is reciprocally supported so that it can move back and forth. An engagement pin 110a of a driving level for upward and downward movement of a carriage provided outside from the lower surface of the main chassis is engaged in an engagement hole 36c (shown in FIG. 7A).

Figure 10:
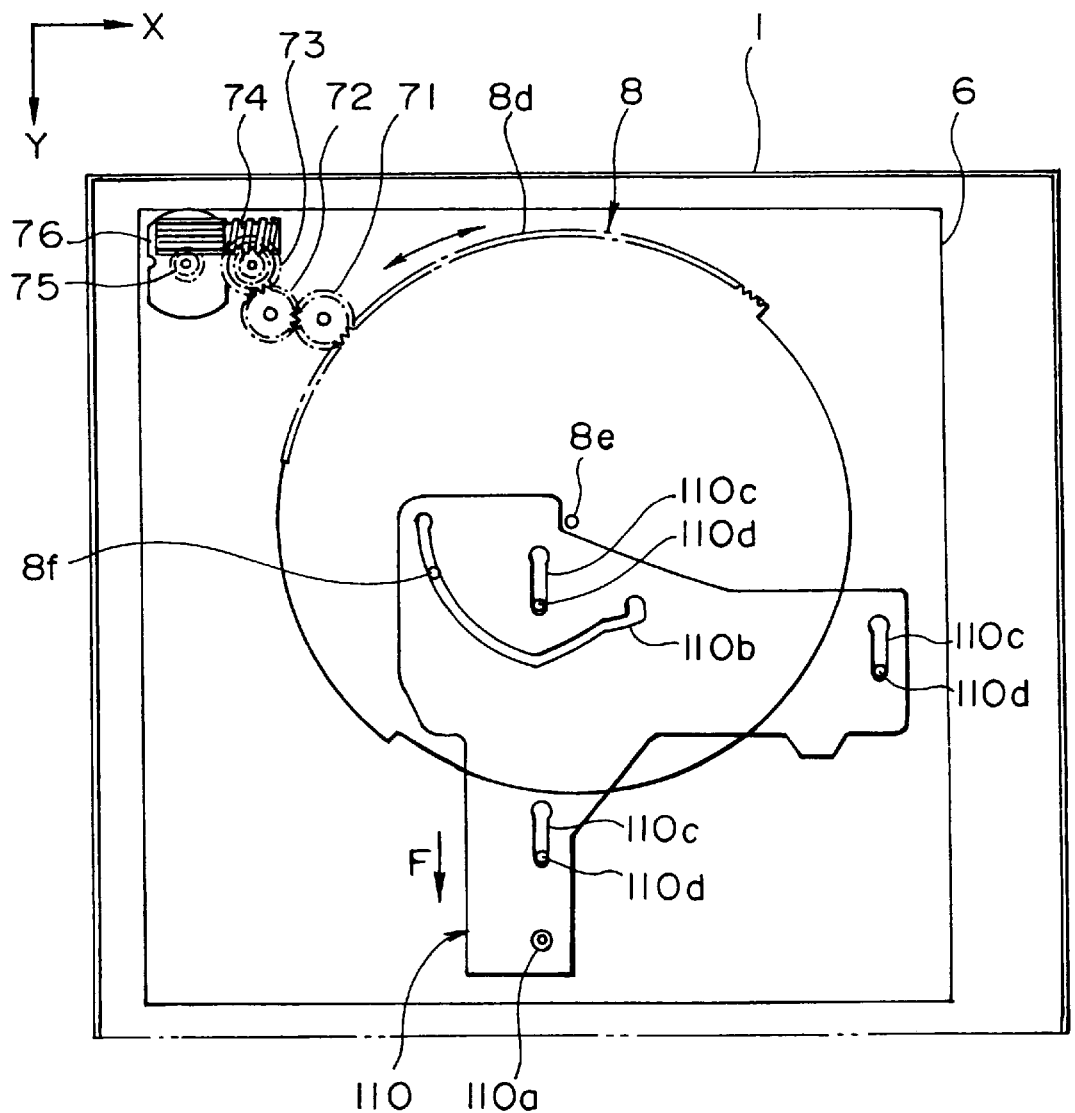
FIG. 10 is a flat view showing a driving lever for moving up and down the carriage according to the present invention.

Namely, as shown in FIG. 10, a cam gear is rotatably provided around a supporting shaft 8e on a top surface of the main chassis with the driving level 110 for moving up and down a carriage provided on a lower surface of the main chassis 6 (indicated with a solid line in the figure for convenience of illustration). This driving lever 110 has a guide long hole 110c inserted by a guide pin 110d planted on the main chassis so that the driving lever 110 can reciprocally be moved back and forth (in the Y-axial direction). An engagement pin 8f buried in the cam gear 8 is engaged in a cam groove 110b formed in the driving groove 110, and this engagement pin 8f can move along the cam groove 110b.

Accordingly, when the cam gear 8 is rotated counterclockwise by driving device 71, 72, 73, 74, 75, and 76 described later, the driving lever 110 is moved forward (in the direction F) due to a cam effect by the cam groove 110b with the engagement pin 8f engaged therewith. Because the engagement pin 110a is engaged in the engagement hole 36c of the cam plate 36, the cam plate 36 also moves forward in association with movement of the driving lever 110. Then, engagement pin 31b of the carriage carrier frame 31 is raised upward because of the cam effect by the cam groove 36a and the carriage 30 is raised up to a specified height together with the carriage carrier frame 31. On the other hand, when the cam gear 8 is rotated counterclockwise from this state, the carriage 30 follows a reverse course and the carriage 30 goes down to a specified height.

Accordingly, the present provides a carriage lifting device for moving the carriage 30 upward with the cam plate 36, carriage carrier frame 31, driving level 100, and other related components, to a specified height during an operation (for instance, for inserting a disk) at a time when a disk is not being reproduced and also moving downward, when a disk is to be reproduced, to a specified height (Refer to FIG. 3).

As described above, when a disk is not being reproduced, especially when a disk is loaded to or unloaded from a storage section inside the apparatus, by moving upward a disk carrier device comprising the carriage 30 and roller 40, a disk can be loaded or unloaded by moving the disk storage section (holding section), on which a plurality of disks are arrayed in the vertical direction, by as the shortest stroke as possible, and this feature enables minimization of a thickness of the apparatus, namely side reduction of the apparatus. Similarly, if positions for reproduction are provided at two positions in the upper and lower sections, further minimization of the size of the apparatus can be expected.

Now, description is made for a carriage carrier device for carrying a carriage(namely reproducing device) between stand-by position and a reproduction position.

Figure 11:
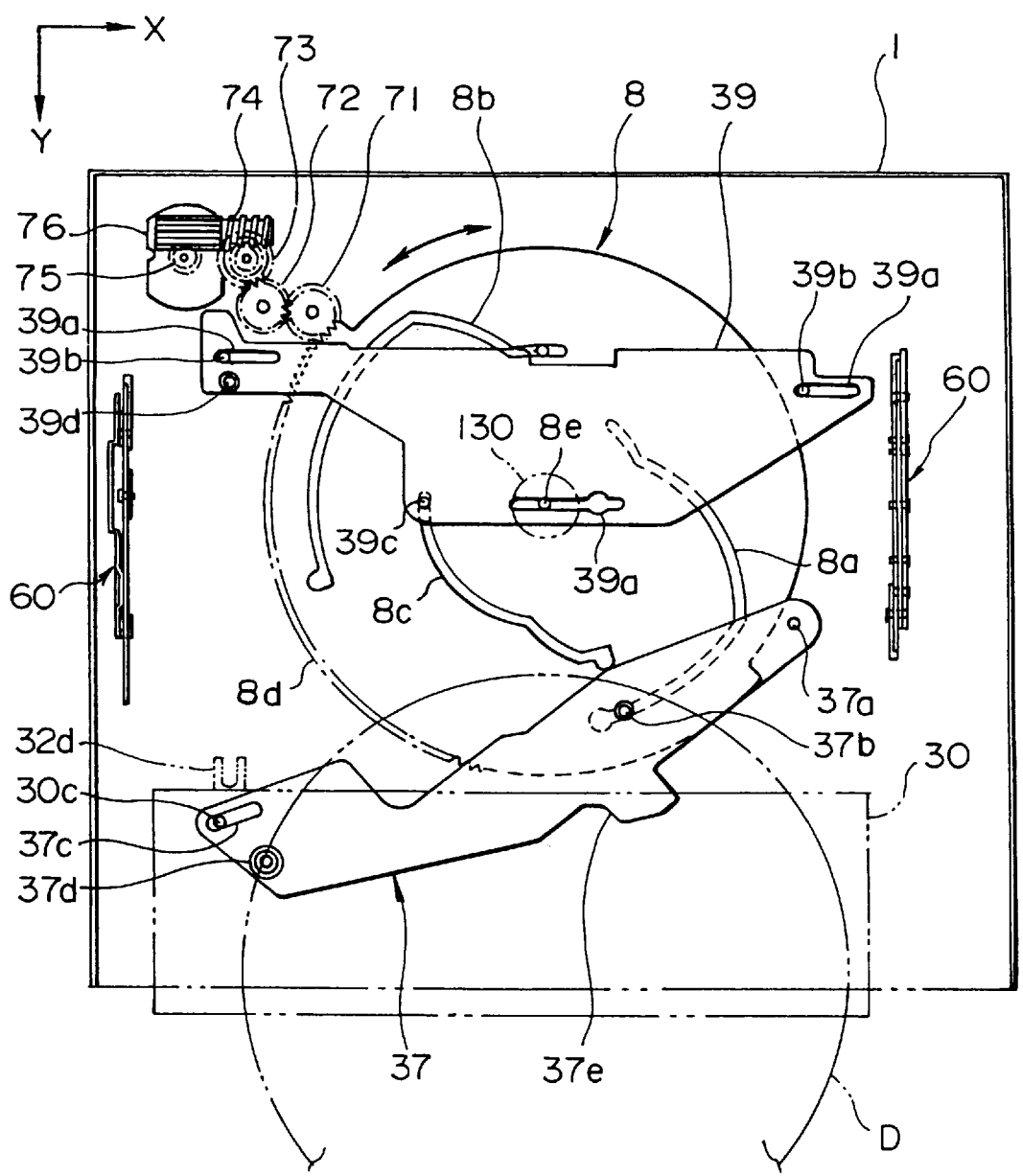
FIG. 11 is a flat view showing the carriage carrying device according to the present invention.

As shown in FIG. 11, a disk-shaped cam gear 8 is rotatably provided around a central shaft 8e on a top surface of the main chassis 6. This cam gear 8 has a first cam groove 8a for carrying a carriage, a second cam groove 8b for separating a tray, and a third cam groove 8c for moving up and down the disk reproducing device. A gear 8d is formed in a portion of the periphery thereof, and the gear 8d is rotated by a motor 76 via a gear array comprising a gear 71, gear 72, two-step gear 73, a gear with a worm 74, and a worm 75 engaged with a spindle or the like.

A swinging arm 37 rotatably provided on the support shaft 37a fixed to the main chassis for driving a carriage is provided above and in front of the cam gear 84. The swinging arm 37 has an engagement pin 37b projecting downward from a substantially central position thereof engaged with the first cam groove 8a of the cam gear 8 and can move along the cam groove. Also the swinging arm 37 has a guide pin 37d projecting downward and engaged with a guide groove (not shown herein) formed on the main chassis 6 provided in the swinging edge section, and further a long hole 37c, in which the engagement pin 30c projecting from a bottom surface of the carriage 30 is slidably engaged, is provided therein.

Figure 12:
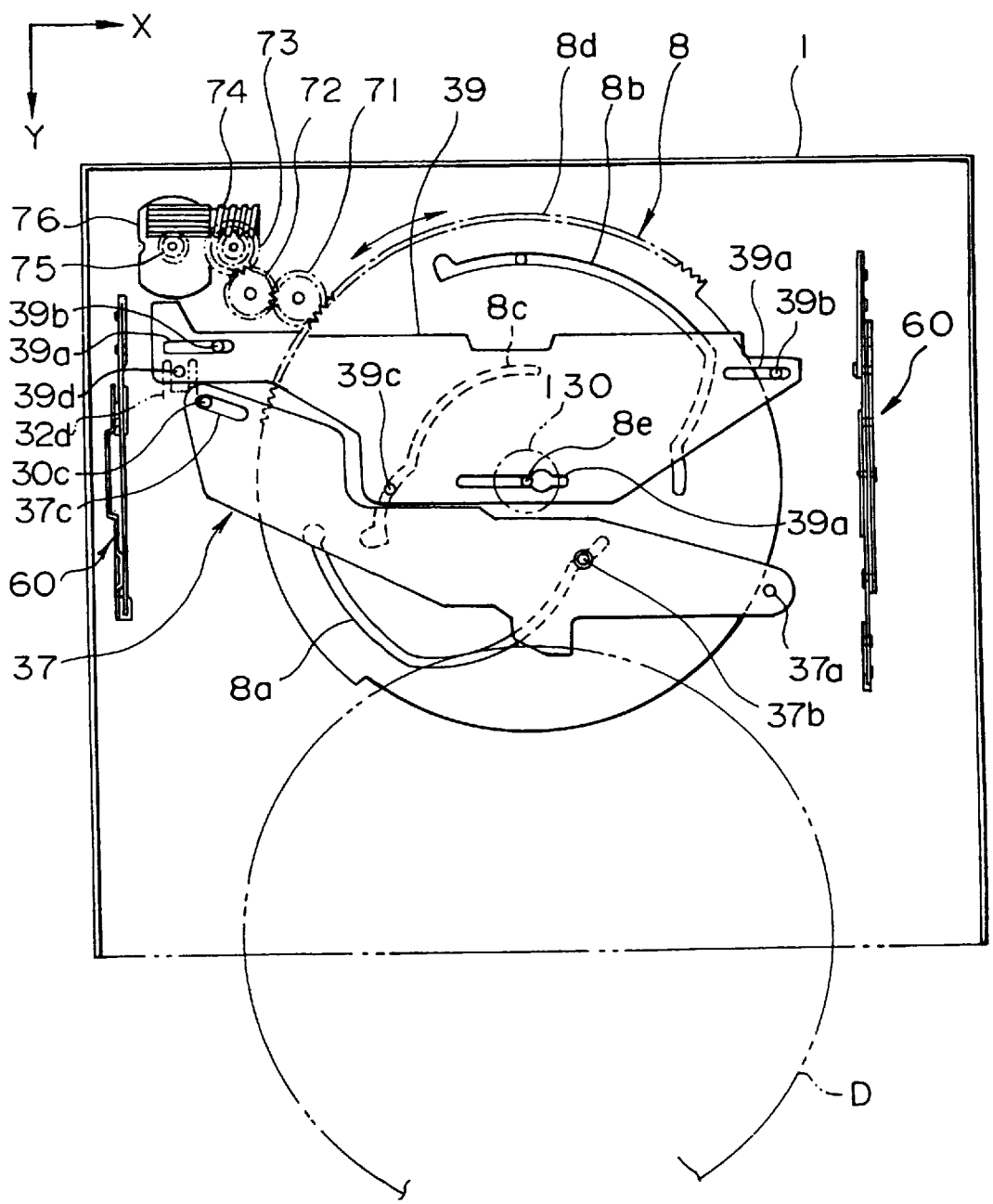
FIG. 12 is a flat view showing the carriage carrying device according to the present invention.

With the construction as described above, when the cam gear is rotated clockwise by a specified angle from the stand-by position shown in FIG. 11, the swinging arm 37 is swung backward (in a direction reverse to the Y-axial direction) due to a cam effect of the first cam groove 8a, and reaches a reproduction position shown in FIG. 12. In this step, as the engagement pin 30c of the carriage 30 is engaged with the long hole 37c, the carriage 30 is moved in association with movement of the swinging arm 37, and is carried along the guide shaft 38 to the reproduction position.

The carriage carrier device for moving a carriage back and forth (in the Y-axial direction) comprises the cam gear 8, swinging arm 37, an array of gears 71, 72, 73, 74, 75, and the motor 76.

Also a slide lever reciprocally moved right and lift (in the X-axial direction) is provided at the back of the main chassis 6 and above the cam gear 8. This slide lever 39 is supported with the guide pin 39b planted in the main chassis 6 engaged with the guide long hole 39a so that it can move right and left as shown in FIG. 11. Also, the slide lever can move along the cam groove when the engagement pin 39c projecting downward is engaged with the third cam groove 8c of the cam gear 8, and further an engagement pin 39d projecting upward is provided in one edge section thereof. It should be noted that a lower columnar member 130 is provided on the slide lever 39 around the central shaft 8e (Refer to FIG. 11 and FIG. 12), and the lower columnar member 130 is engaged with a central hole of a disk separated downward by a tray separating device described later to prevent from the disk from rattling.

When the carriage 30 reaches the reproduction position in association with rotation of the cam gear 8 described above, the U-shaped engagement piece 32d of the slide plate 32 carried on the carriage 30 is engaged with the engagement piece 39d to hold it. In this state, if the cam gear 8 is further rotated, the slide lever 39 is moved in a direction reverse to the X-axial direction due to a cam effect by the third cam groove 8c, and at the same time also the engagement piece 32s is moved in the same direction. The reproducing device carrier frame 35 is moved upward due to the effect by the slide plate 32, joint link 33, and cam hole 32b, and the turn table 20 carries a disk to be reproduced. Also in association with movement of the slide lever 39, the lower columnar member 130 is moved upward by a specified distance due to the effect of an interlocking device and a cam device (both not shown herein), so that an upper edge thereof contacts a lower surface of the carriage 30 at the reproduction position to lock the carriage 30. With this feature, rattling of the carriage 30 is prevented when a disk is being reproduced. Also when the slide lever 39 is moved in the X-axial direction, the reproducing device carrier frame 35 is moved downward. It should be noted that also the lower columnar member 130 is moved downward.

A lifting device for upward and downward movement of the reproducing device such as a pickup and a turn table, is provided by the cam gear 8, slide lever 39, slide plate 32, joint link 33, cam hole 32, or the like.

Next description is made for a disk holding device for arraying a plurality of disks in the vertical direction (in the Z-axial direction) and holding the disks.

As shown in FIG. 2, the disk holding device 50 is positioned at the deepest position of the apparatus, and comprises a lower holder 52 supported by a pantograph mechanism 51, a plurality of trays (4 sheets in this embodiment) each for carrying disks stacked on this lower holder, an upper holder 53 for pressing these trays from the upper side, and a spring 55 engaged to energize the lower holder and upper holder 54 so that they get closer to each other.

Figure 13A:
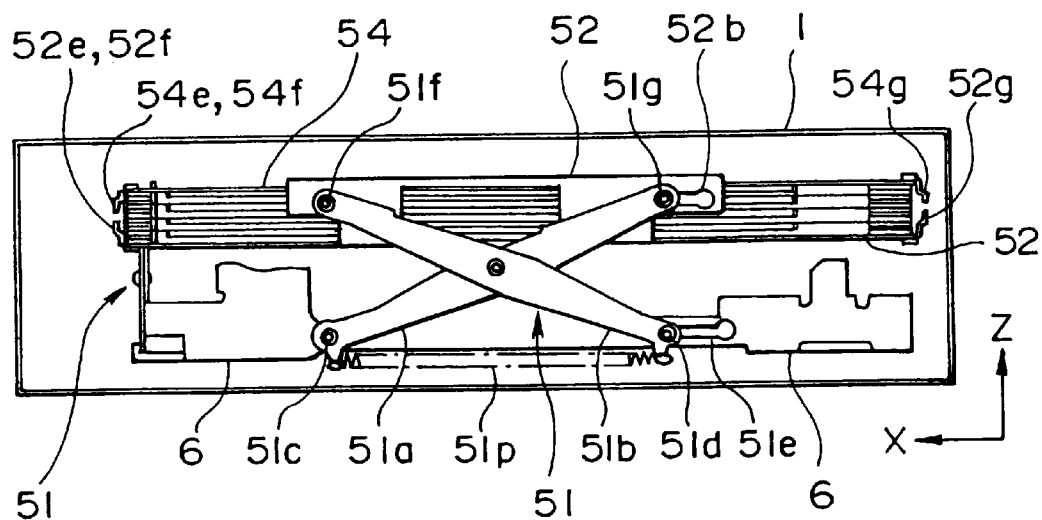
Figure 13B:
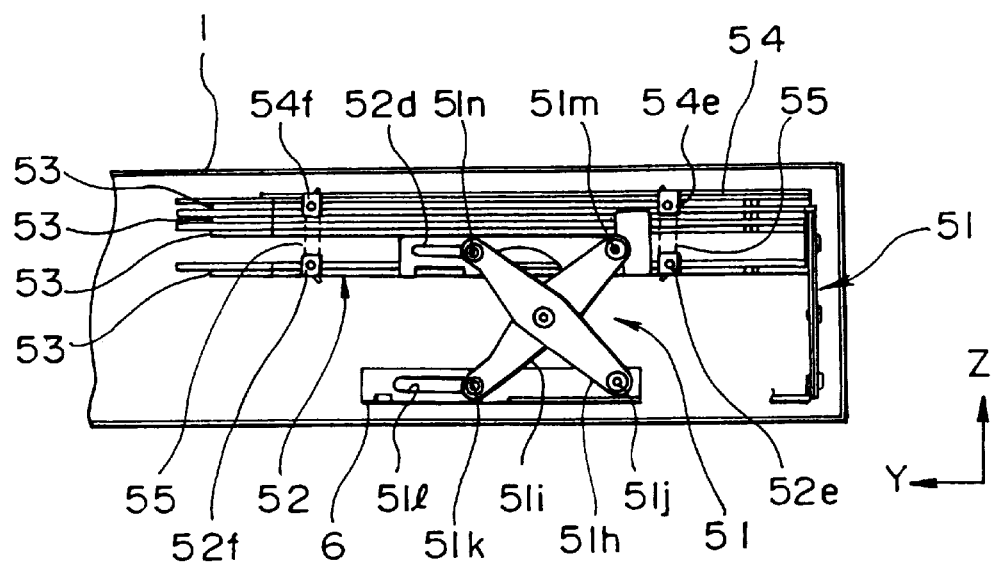

An outline of the disk holding device is shown in FIG. 13A and FIG. 13B. FIG. 13A is a rear view showing the apparatus viewed from the rear side, while FIG. 13B is a side view showing the apparatus viewed from one side thereof. It should be noted that FIG. 13B shows a state where the a tray at the lowest position has been separated from other trays. As shown in these figures, the pantograph mechanism 51 comprises a first lever 51a and a second lever 51b each positioned at the rear side thereof, and further comprises a third lever 51h and a fourth lever 51i each positioned at the side thereof; the first lever 51a has one edge section thereof pivotally supported around a support shaft f with a pin 51g planted on the ether edge section thereof slidably engaged in a long hole 52b of the lower holder 52; the second lever 51b has a pin 51d planted in one edge section thereof slidably engaged with a long hole 51e of the main chassis 6 with the other edge thereof pivotally supported around the support shaft 51f engaged with the hole 52a of the lower holder 52. Similarly the third lever 51h has one edge section rotatably supported around a support shaft 51j engaged in the main chassis 6 with a pin 51n planted in the other edge section thereof slidably engaged with the long hole 52d of the lower holder 52; and the fourth lever 51i has a pin 51k planted in one edge section thereof slidably engaged with the long hole 51l of the main chassis 6 with rotatably supported around a support arm 51m engaged with the hole 52c of the lower holder 52.

Further a spring 51p is spanned between lower edge sections of the first lever 51a and second lever 51b, and the two levers 51a and 51b are urged so that the lower edge sections get closer to each other, namely in a direction to raise the lower holder 52 with the pantogrpah 51.

As described above, 4 sheets of tray 53 each carrying a disk thereof are stacked on a top surface of the lower holder 52 supported by the pantograph 51 (Refer to FIG. 14A to FIG. 14D).

Figure 15:
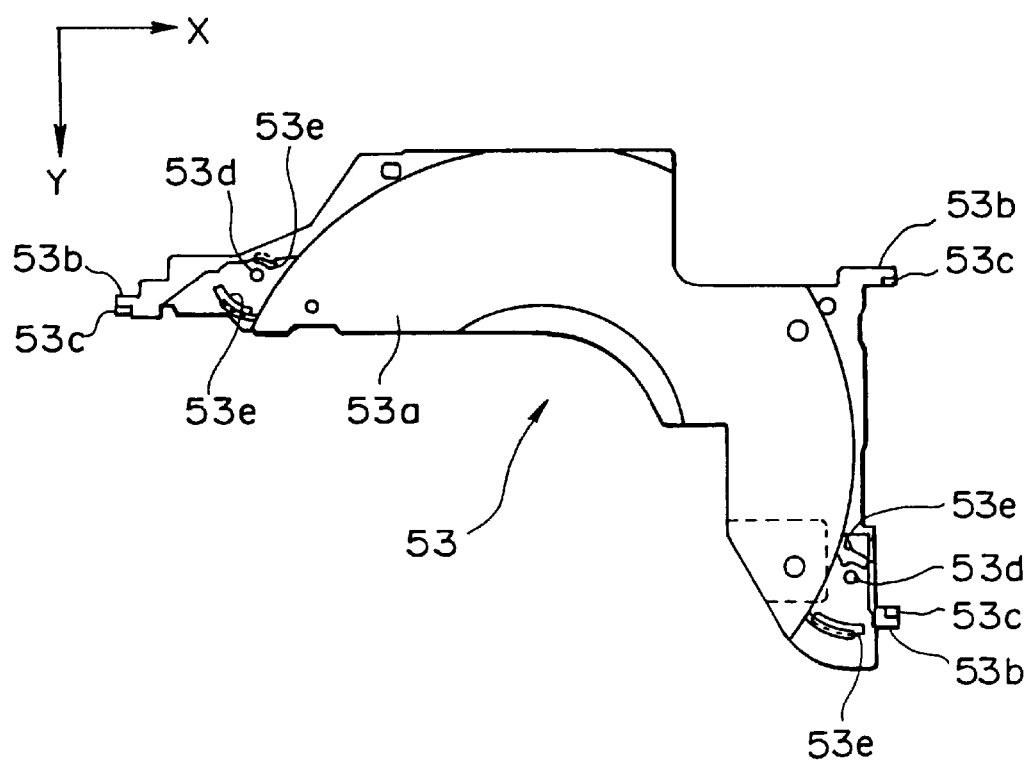
FIG. 15 is a plan view showing a tray according to the present invention.

As shown in FIG. 15, the tray 53 comprises a disk carrying section 53a formed along a periphery of a disk with a concave form having a depth larger than thickness of the disk, an area with a support hole 53d having an upper surface positioned slightly lower from the disk carrying section, to which an arm for positioning a disk, and an arched guide groove 53e formed thereon, and three tray supporting sections 53b each supported by a tray separating device described later and extending in the right-and-left direction (in the X-axial direction). It should be noted that a tapered section 53c forming a taper in the Y-axial direction is formed in this tray supporting section 53b so that the tray separating device described later can easily be engaged therewith.

Figure 16:
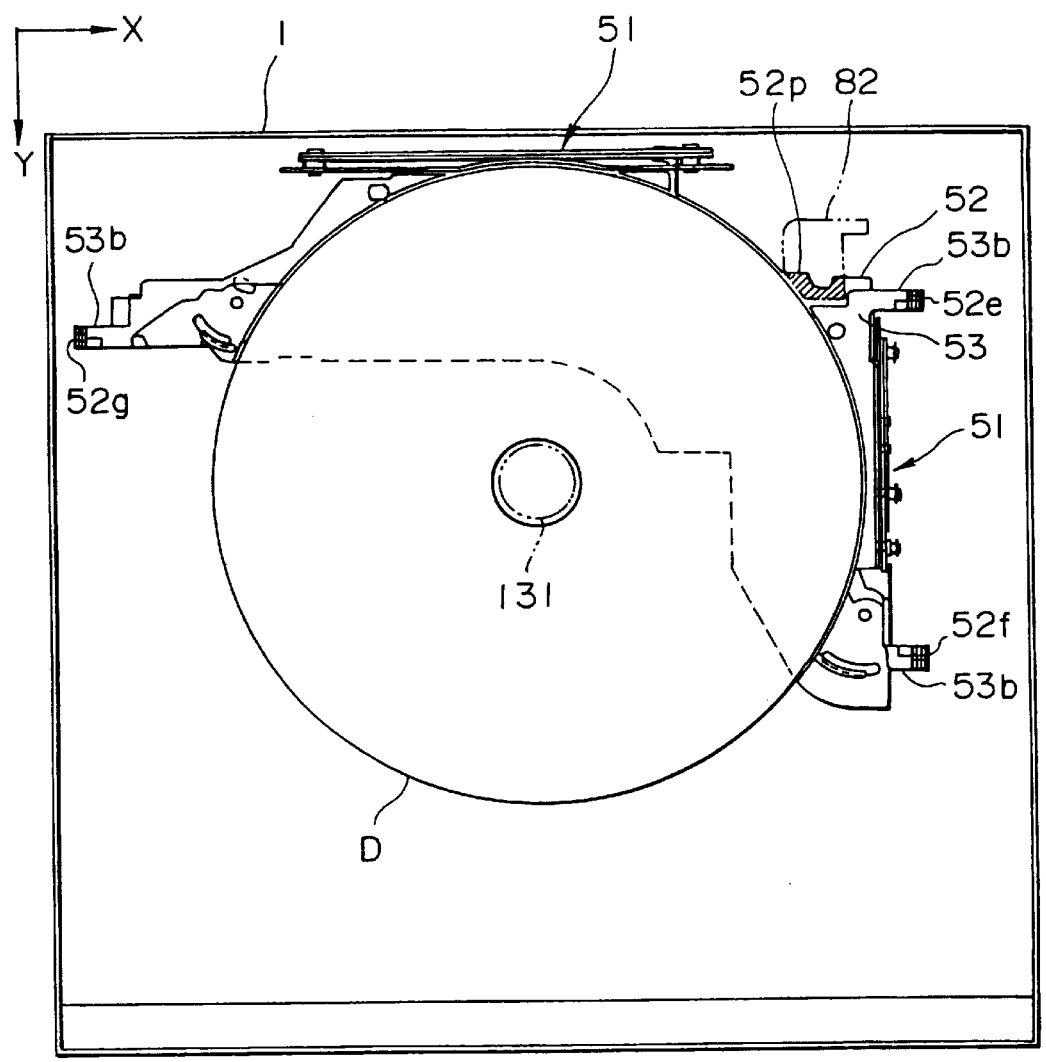
FIG. 16 is a plan view showing the disk holding device according to the present invention.

FIG. 16 is a top view showing a state where the trays 53 are stacked on the lower holder 53 and a disk D is loaded on each of the trays. As shown in this figure, a rear side area 52p of the lower holder 52 is positioned so that it is exposed to outside even in the state where the trays haven been stacked each with a disk loaded thereon, and an abutting member 82 described later contacts this area 52p.

The upper holder 54 is positioned above a top one of the trays 53 stacked as described above. Further, above this upper holder 54, a cover plate (not shown) is attached to upper edge sections 6a, 6b of the main chassis 6, and an upper columnar member 131 to be engaged with a central hole of a disk is positioned in an inner and lower surface thereof (Refer to FIG. 3 and FIG. 16). The upper columnar member 131 engages with a central hole separated upward by the tray separating device and prevents the disk from rattling. It should be noted that the upper columnar member 131 can also play a role as an energizing device for pressing a clamper to a disk by employing the construction in which the upper columnar member 131 projects downward to engage with a clamper described later.

As shown in FIG. 17A and FIG. 17B, the upper holder 54 has a substantially identical the same form as that of the lower holder, and also has locking sections 54e, 54f, and 54g each extending in the right-and left direction and hanging downward. As shown in FIGS. 14A to 14D, also the lower holder 52 has locking sections 52e, 52f, 52g each extending in the right-and-left direction and projecting upward. The springs 55 are spanned between corresponding locking sections of the lower holder 52 and the upper holder section 54 (Refer to FIG. 8, FIG. 9, and FIG. 13B), and are biased so that the two holder get closer to each other. That is the two holders hold therebetween the trays 53 stacked from the upper and lower sides.

Next description is made for the tray separating device for separating, when a desired one is selected from a plurality of disks carried on the disk holding device to play it back, a tray carrying the disk thereon from other trays.

As shown in FIG. 18A to FIG. 18C, the slide plate 61 for separating a tray is provided on and along an external lower surface of the main chassis 6 (indicated by a solid line in the figure so that it can easily be recognized). A pin 61d fixed on the main chassis 6 passes through the guide long hole 61b provided on the slide plate 61, and an engagement pin 61a is inserted in the second cam groove 8b of the cam gear 8 provided above a bottom surface of the main chassis 6 so that the engagement pin 61a can move along the groove 8b. Namely the slide plate 61 for separating a tray is supported so that the slide plate 61 is moved reciprocally back and forth (in the Y-axial direction) in association with rotation of the cam gear 8.

Figure 22A:
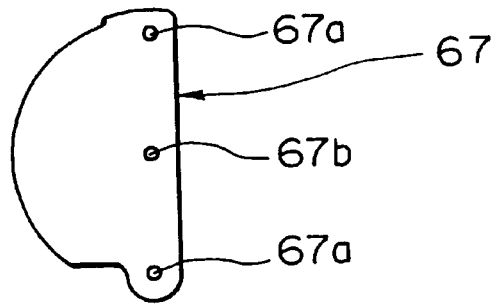
FIGS. 22A to 22C are views each showing components constituting the tray separating device according to the present invention.
Figure 22B:
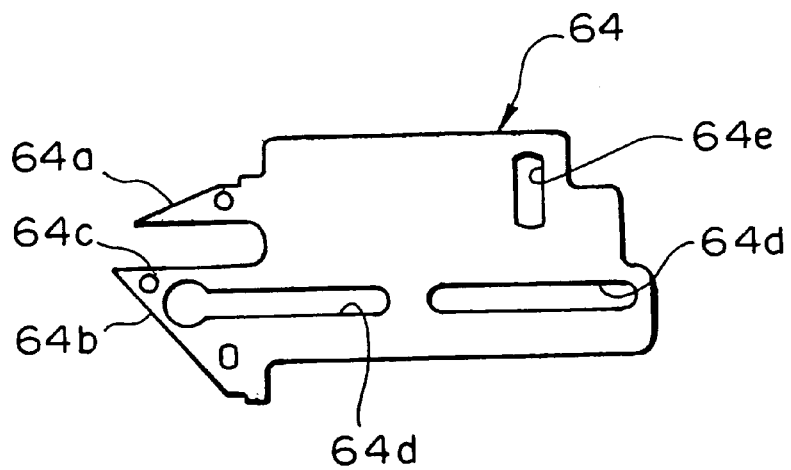
Figure 22C:
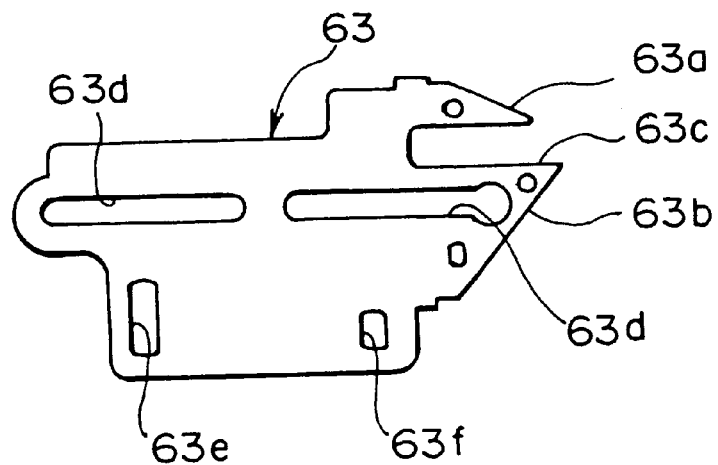

Right and left edge sections of the slide plate 61 (extending in the X-axial direction) for separating a tray are bent upward (in the Z-axial direction) with the engagement pins 61c planted therein, and the engagement pins 61c are engaged with an engagement hole 63f of a first separating lever 63 as a wedge-shaped member (Refer to FIG. 22C) and an engagement hole 66g of a third separating lever as a wedge-shaped member respectively. It should be noted that the first separating lever 63 and second separating lever 64 are linked via a joint plate 67 to each other so that the levers are moved in the reverse directions respectively in association with movement of each other.

With this feature, when the cam gear 8 is rotated clockwise by a specified angle by the motor 76, the slide plate 61 for separating a tray is moved backward (to the depth of the apparatus) by a specified distance due to the cam effect of the second cam groove with which the engagement pin 61a is engaged. At the same time the first separating lever 63 and second separating lever 66 are moved backward, while the second separating lever 64 moved frontwards and reaches a position for a separating operation.

Figure 20A:
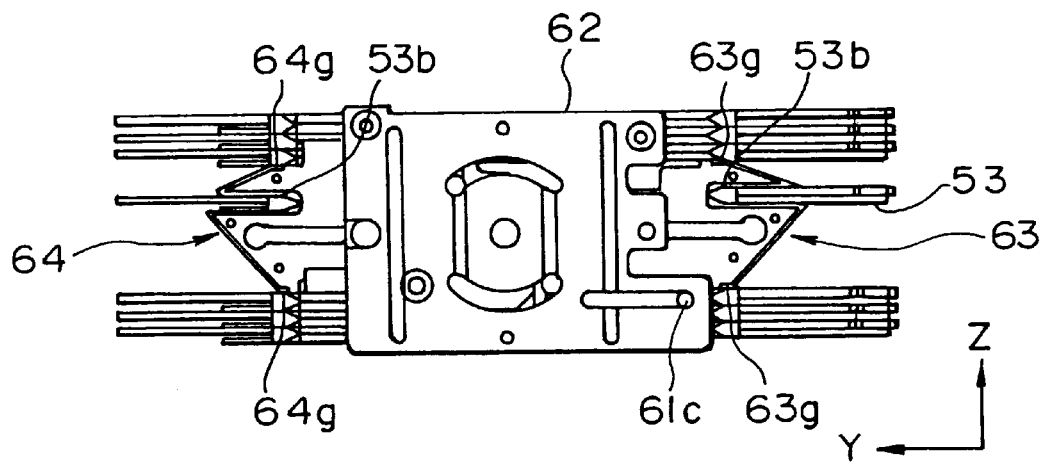
FIGS. 20A and 20B are side views showing a state where a tray carrying a selected disk has been separated by the tray separating device according to the present invention.
Figure 20B:
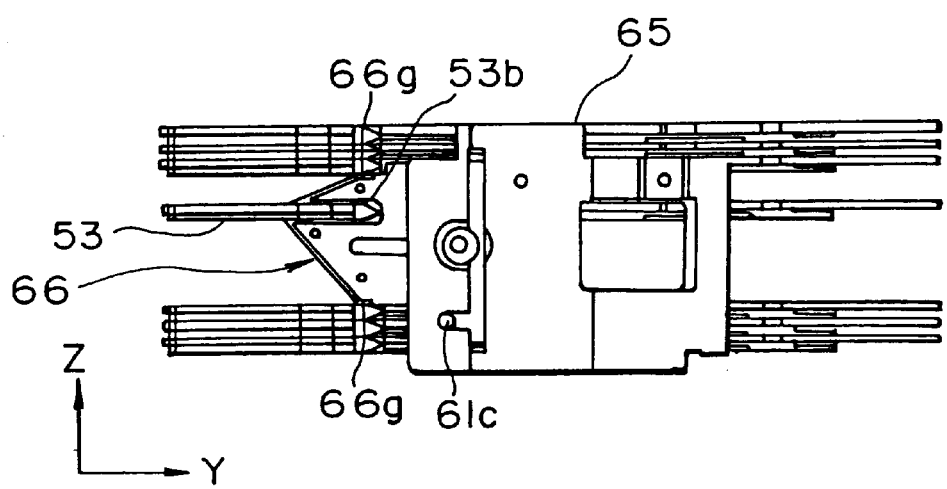

FIG. 20A and FIG. 20C show a state where each of the separating levers 63, 64, and 66 operated and one of the trays 53 has been separated from the other trays, and also in these figures, a case where 7 sheets of tray are provided, and the fourth tray from the bottom (namely a disk) has been separated from the other ones.

Next description is made for construction of the separating lever with reference to FIG. 21A through FIG. 21G. It should be noted that, in the figures, portions which should generally be indicated by a dotted line for the nature are indicated by a solid line for convenience of visual recognition and description. The separating members 63, 64, 66 each as a wedge-shaped member are positioned along the side walls 6a, 6b of the main chassis as shown in FIG. 2, FIG. 18A to FIG. 18C, and FIG. 19A to 19C. The separating levers are supported by brackets 65, 62 fixed to the side wall 6a, 6b respectively.

Figure 21A:
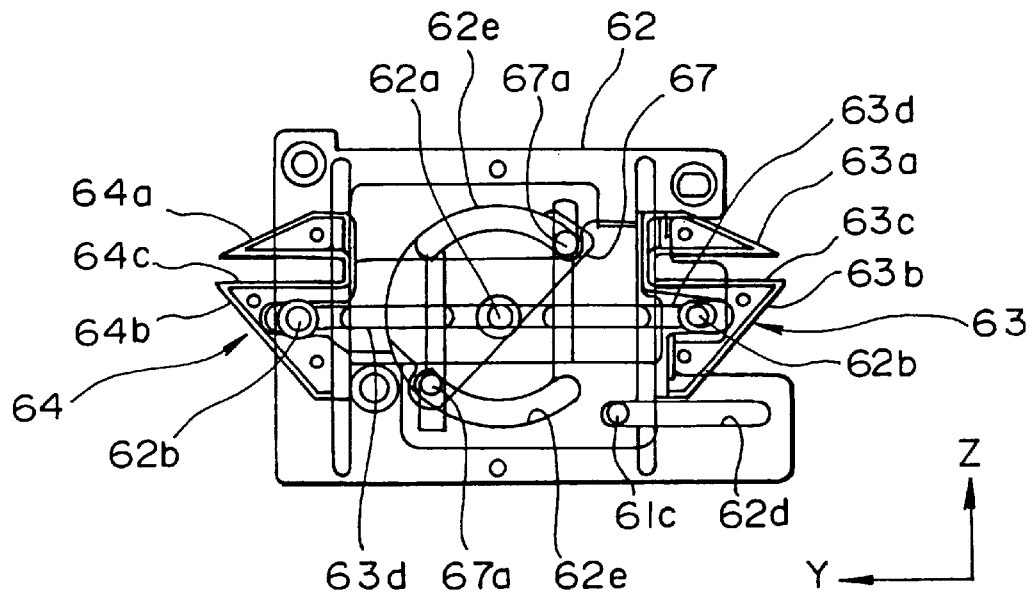
FIGS. 21A and 21B are views each showing configuration of the tray separating device according to the present invention.
Figure 23:
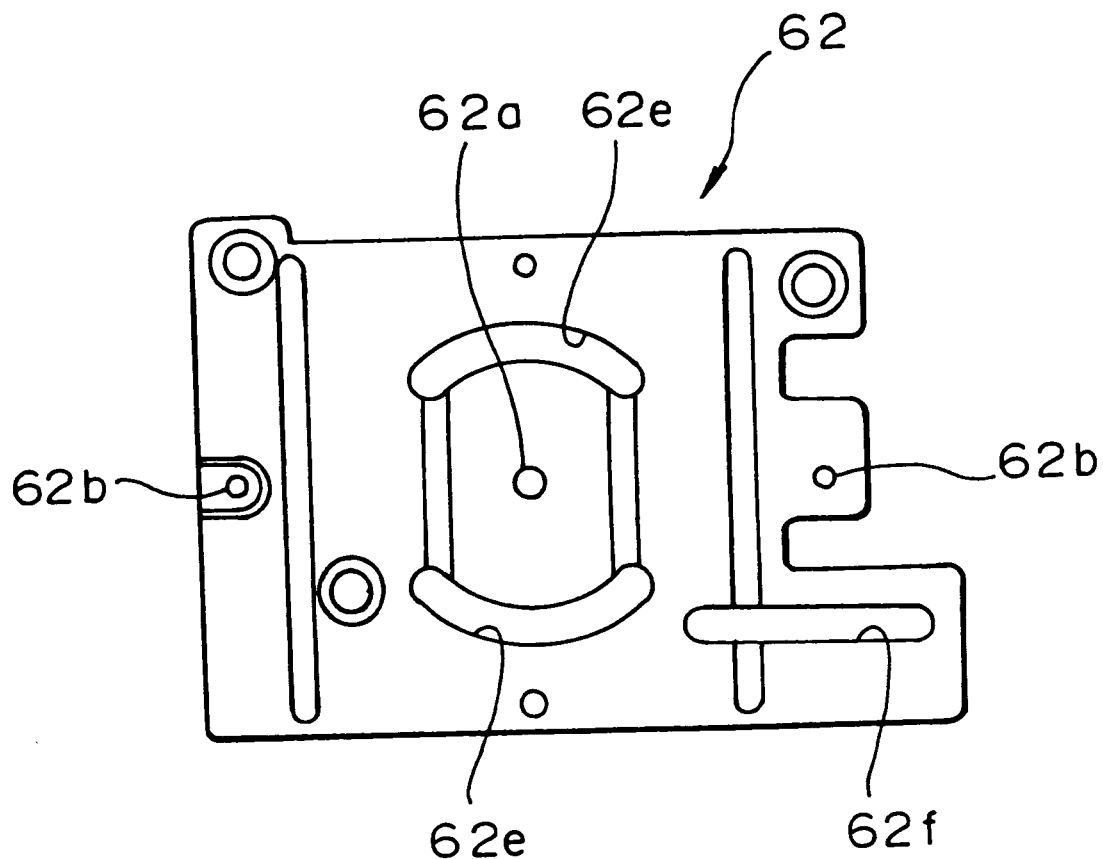
FIG. 23 is a view showing components constituting the tray separating device according to the present invention.

As shown in FIG. 21A and FIG. 23, the first separating lever 63 and second separating lever 64 have the guide long holes 63d, 64d engaged from outside with the central shaft 62a and guide pin 62b respectively so that the levers can move back and forth (in the Y-axial direction) respectively. Also a semi-circular joint plate is attached to the central shaft 62a of the bracket 62 so that the joint plate 67 can rotate around a position of the hole 67b as a center. An engagement pin 67a provided in the joint plate 67 is inserted into the engagement hole 63e of the first separating lever 63, an engagement hole 64e of the second separating lever 64, as well as into the arc-shaped groove 62e of the bracket 62, and the joint plate 67 can rotate in a range of the arc-shaped groove 62e.

Figure 21B:
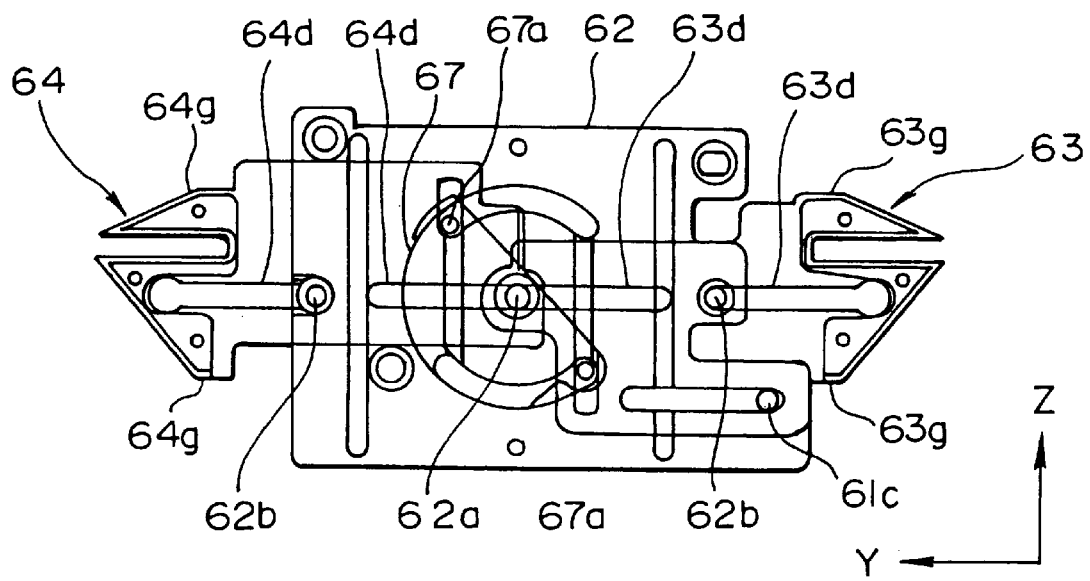

Accordingly, when the engagement pin 61c of the slide plate 61 for separating a tray moves backward from the stand-by position shown in FIG. 21A, the first separating lever 63 moves backward together with the engagement pin 61c, the joint plate 67 is rotated counter clockwise, and the second separating lever 64 moves forward in association with rotation of the joint plate 67 and reaches a position for a separating operation shown in FIG. 21B.

As shown in FIG. 24A, FIG. 24B, FIG. 25A, and FIG. 25B, the third separating lever 66 has the guide long hole 66d engaged with the guide pin 65a provided in the bracket 65 from the outside so that it can move back and forth reciprocally.

Figure 24A:
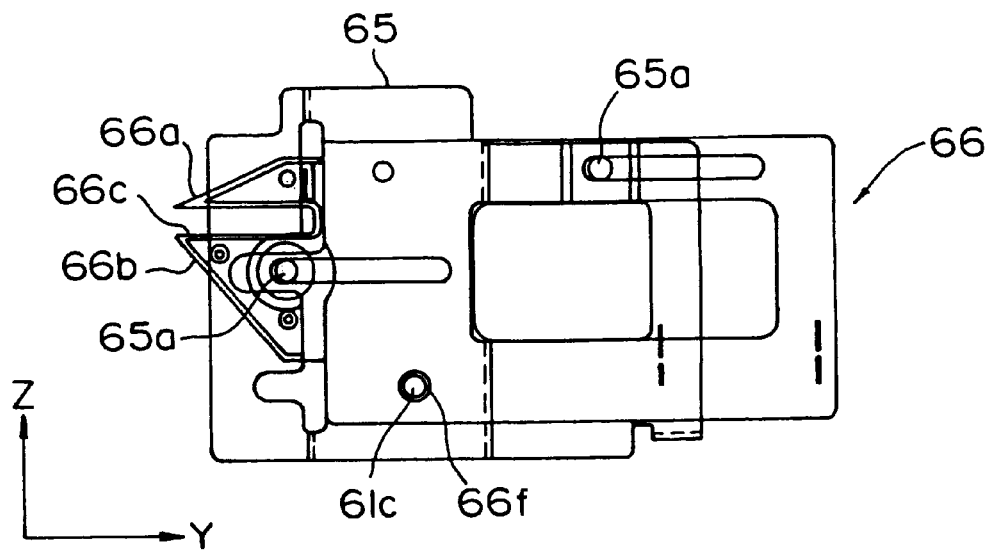
FIGS. 24A and 24B are views each showing configuration of the tray separating device according to the present invention.
Figure 24B:
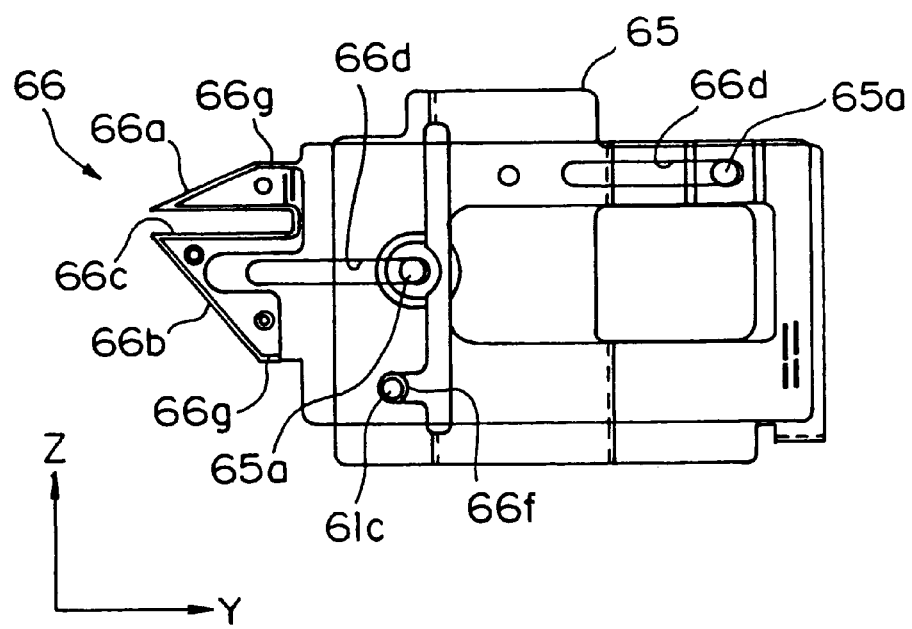
Figure 25A:
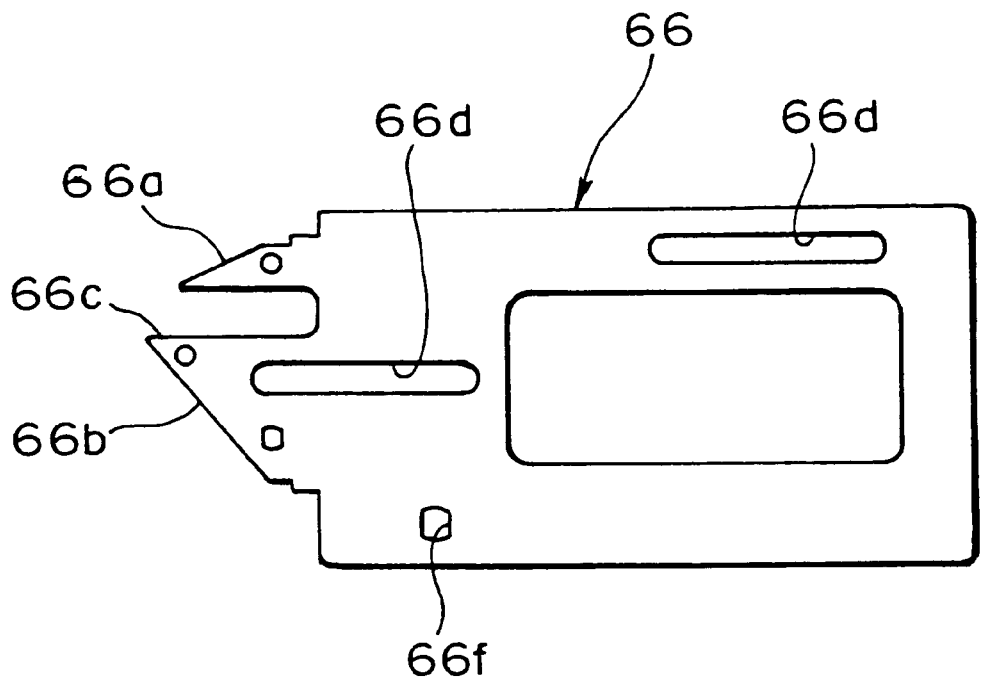
FIGS. 25A and 25B are views each showing components constituting the tray separating device according to the present invention.
Figure 25B:
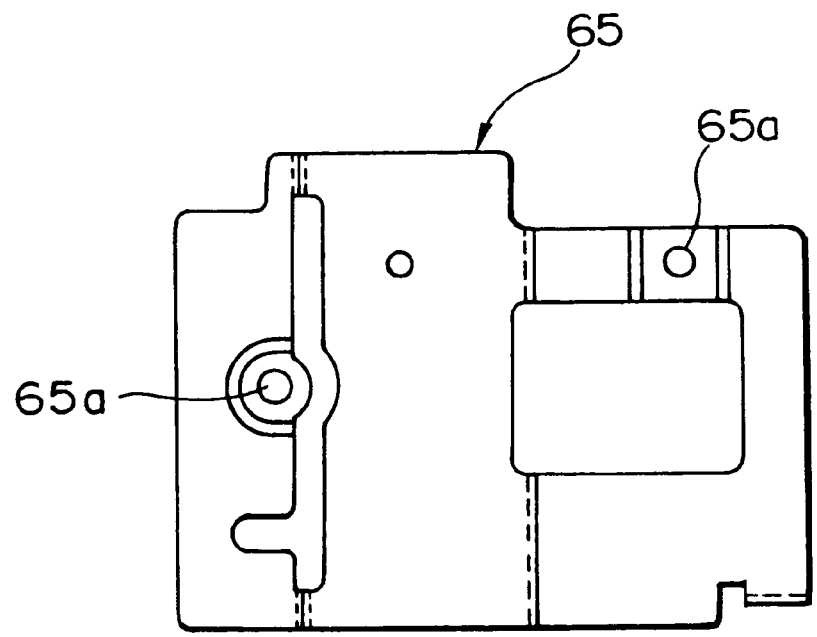

So, when the engagement pin 61c of the slide plate 61 for separating a tray moves backward (in a direction reverse to the Y-axial direction) from the stand-by position shown in FIG. 24A, the third separating lever 66 moves backward together with the engagement pin 61c and reaches a position for a separating operation shown in FIG. 24B.

A section effective for separation of each of the separating levers 63, 64, and 66 has a substantially wedge-shaped form, and has first taper sections 63a, 64a, 66a each as a gently slanting section provided in the upper section and second taper sections each as a sharply slanting section provided in the lower section with notched sections 63c, 64c, and 66c therebetween.

Slope of each of the second taper sections 63b, 64b, and 66c is more steep as compared to that of each of the first taper sections 63a, 64a, and 66a, so that, when trays are separated by the two taper sections in the vertical direction, a distance of movement of the tray moved downward is larger than that of a tray moved upward. For this reason, a space into which a clamper projects is secured above a tray carrying a disk selected to be reproduced, and also an adequate space is secured under it, so that the carriage 30 carrying thereon a reproducing device can enter the lower space.

It should be noted that, at the position for a separating operation, as shown in FIG. 20A, in the trays 53 separated by the taper section in the vertical direction, an upper surface or a lower surface of the supported section 53 abuts against flat sections 63g, 64g, 6g of the separating levers 63, 64, 66 so that the trays 53 are tightly fixed in the vertical direction (in the Z-axial direction).

Accordingly, the apparatus according to the present invention, provides a tray separating device for separating a tray 53 carrying thereon a disk to be reproduced from other trays in the vertical direction via the cam groove 8b of the cam gear 8, slide plate 61, first separating lever 63, second separating lever 64, third separating lever 66, joint plate 67 or other related sections.

As described above, by providing a wedge-shaped member effecting in a direction substantially perpendicular to a direction in which trays are arrayed as a device for selecting a tray carrying thereon a disk to be reproduced and separating the tray from other trays, construction of the apparatus can be simplified, which enables size reduction of the apparatus. Further, a number of trays can easily be increased or decreased, which allows diversified forms of the apparatus.

Next description is made for a lifting device for moving up and down the disk holding device 50 and positioning the disk at a specified height in the vertical direction when selecting a disk specified to be reproduced.

Figure 26:
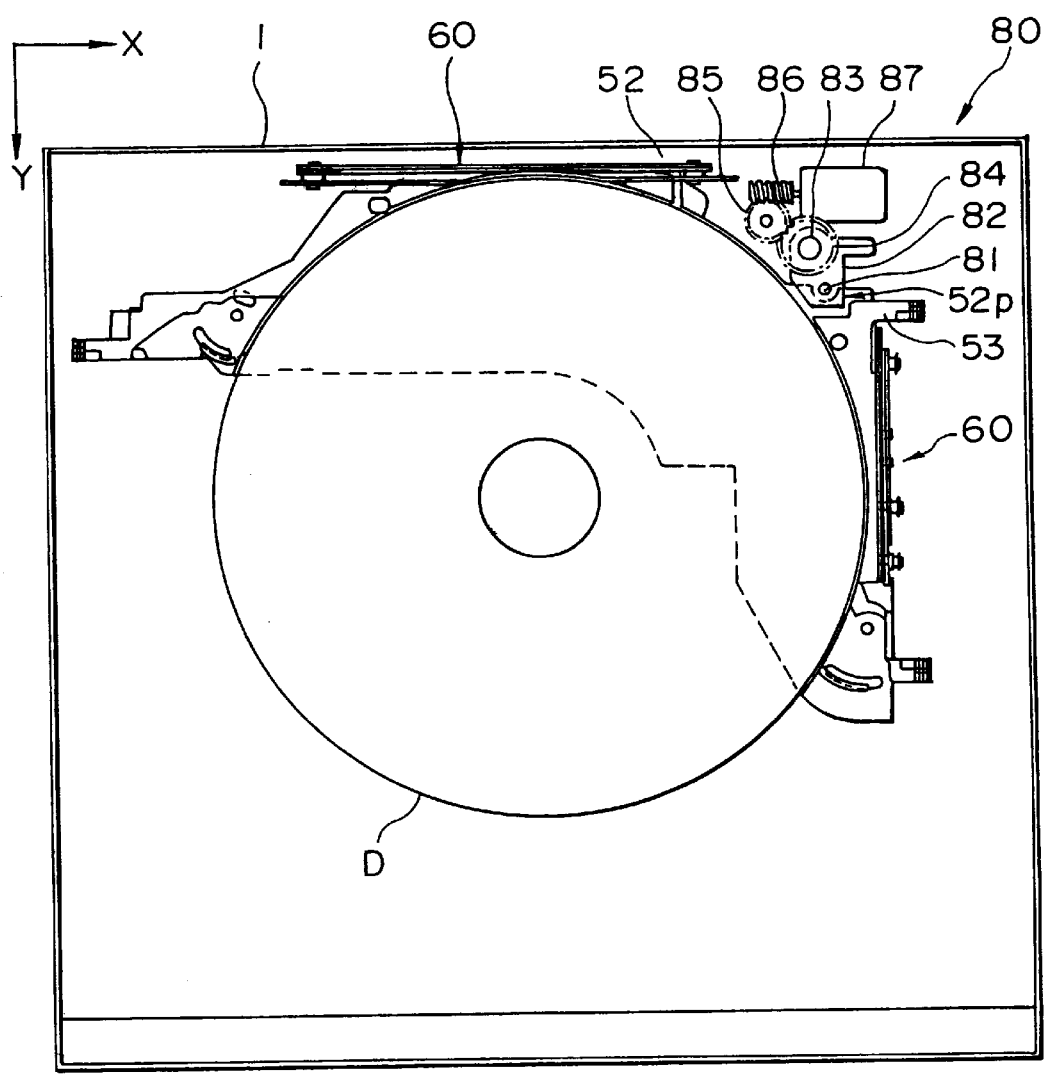
FIG. 26 is a flat view showing a lifting device for moving up and down the disk holding device according to the present invention.

As shown in FIG. 26, an abutting member 82 slidably engaged with a guide shaft 81 extending in the vertical direction from the outside is provided in a rear right-side section of the apparatus so that the abutting member 82 abuts against an area 52p of the lower holder 52 from the upper side. Also this abutting member 82 is screwed into a feed screw formed integrally with the gear 84 and extending in the vertical direction. The gear 84 is engaged with the gear 85, and this gear 85 is engaged with a worm 86 engaged with a spindle of the motor 87. So, when the motor 87 is rotated, the abutting member 82 is moved in the vertical direction by the worm 86, gear 85, gear 84, and feed screw 53. In this step, as the lower section 52 is always urged upward by the pantograph mechanism described above, when the abutting member 82 is moved upward, the lower holder also is moved upward following the abutting member 82 due to the energizing force thereof, and when the abutting member 82 is moved downward, the lower holder 52 is moved downward against the energizing force.

There is provided the lifting device 80 for moving up and down the disk holding device 50 with the guide shaft 81, abutting member 82, feed screw 83, gears 84, 85, worm 86, motor 87 and other related sections and positioning a desired disk at a specified height.

Also there is provided a disk selecting device for selecting a desired disk with the lifting device 80, the tray separating device 60, or other related sections.

Next description is made for a disk guiding/positioning device used when a disk is inserted from the insertion opening 5 and is positioned on the tray 53 as well as for a disk take-out device for taking out a disk on the tray 53 to outside of the apparatus.

Figure 27:
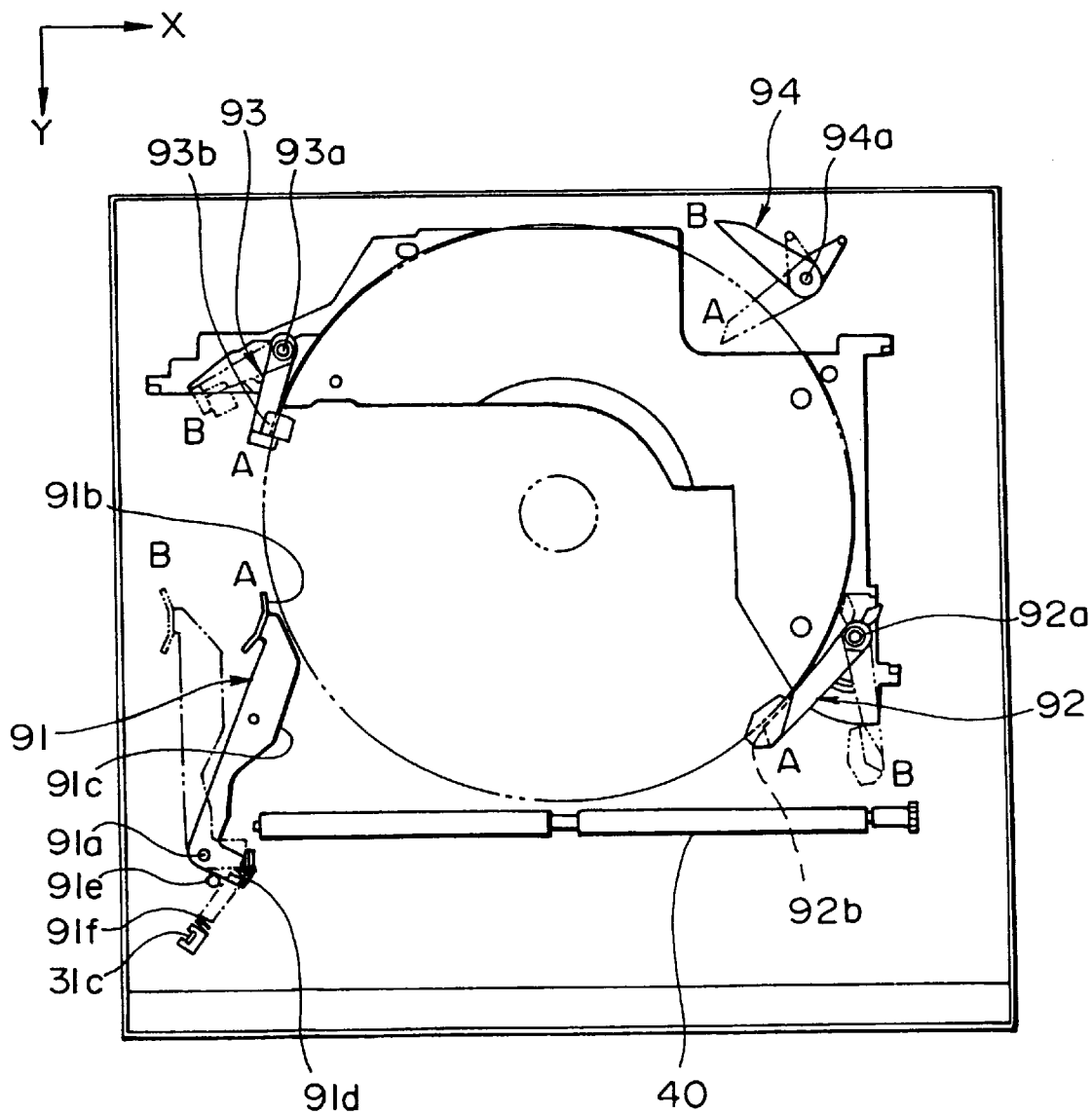
FIG. 27 is a flat view showing a disk guiding/positioning device and a take-out device each according to the present invention.
Figure 28A:
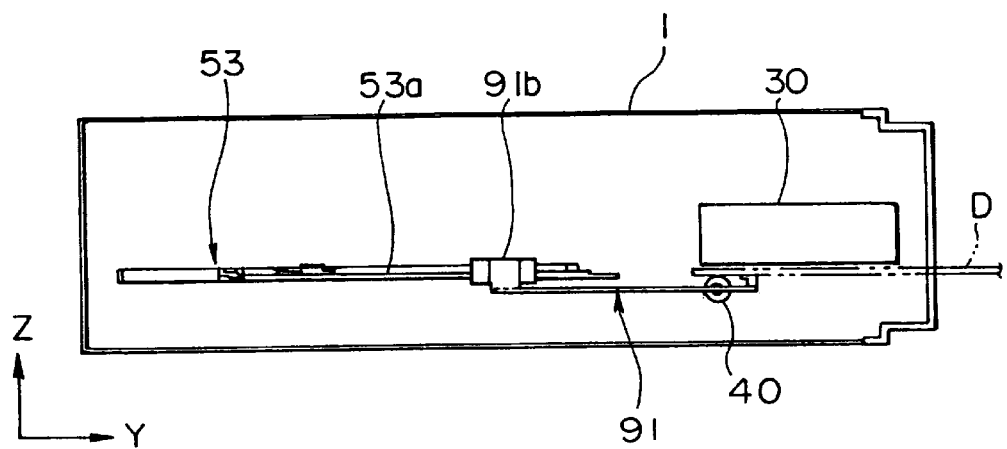
FIGS. 28A and 28B are side views each showing a positional relation between a roller and a tray each according to the present invention when a disk is carried in or carried out.
Figure 28B:
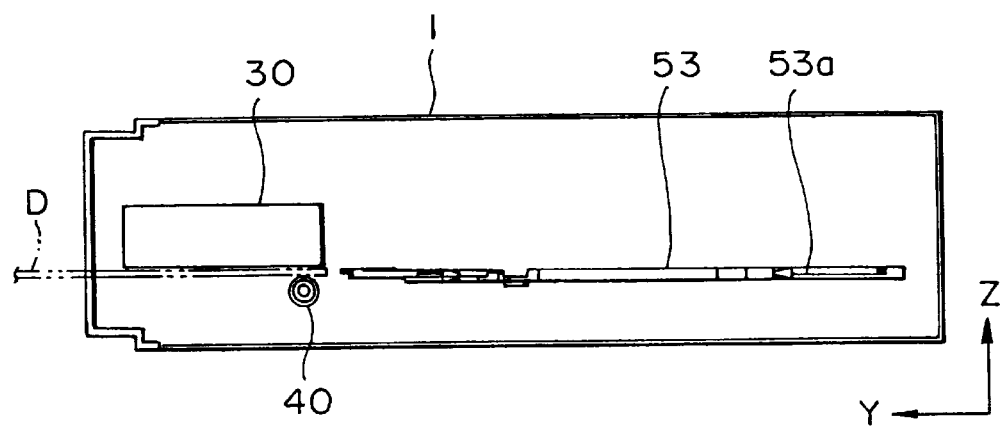

As shown in FIG. 27 and FIGS. 28A, 28B, a disk guide swinging arm 91 for engaging with a periphery of a disk, when carrying a disk, and guiding the disk in a specified direction is provided in front of the apparatus. The swinging arm 91 is swingingly provided in a horizontal plane around a support shaft 91a against the carriage carrier frame 31, and also a spring 91f is spanned between the engagement piece 31c of the carriage carrier frame 31 and the engagement piece 91d of the swinging arm, which is urged clockwise and engaged with a stopper 91e at a locking position A.

Also provided on each tray 53 are two positioning arms 92, 93 so that the arms can be swung around support shafts 92a, 93a, and also the arms 92, 93 are urged by a spring (not shown herein) so that the arms are positioned at a halt position A respectively.

It should be noted that the arms 91, 92, 93 each shown at a position B in FIG. 27 indicate the maximum saving position against a disk respectively.

In the configuration with the arms as described above, when a disk is transported by the roller into the apparatus, a periphery of the disk successively engages with the arms 92, 91, 93 to swing each of the arms to the respective saving position B against an energizing force of the spring. Further when a disk is transported out of the apparatus, the disk leave the roller 40 at a certain point of time and the driving force of the roller 40 becomes ineffective. At this point of time, the disk guide swinging arm 91 moves the disk to a specified carrying section 53a of the tray 53, and with this operation, the disk is completely carried into the interior of the apparatus.

To carry disks onto all the trays 53, the lifting device is actuated to position each tray at a specified position respectively.

It should be noted that, in the state when a disk is positioned at a specifying carriage position of each tray 53, the engagement piece 91b, 92b, and 93b are slightly off with a small gap from periphery sections of the disks.

When a disk on the tray 53 is carried out of the apparatus, the disk is pushed out due to the effect by the push-out arm 94 swingingly provided around a support shaft 94a at a rear section of the apparatus. Namely, the roller 40 is rotated in a direction reverse to the direction in which the roller 40 is rotated when carrying in a disk, and at the same time the push-out arm 94 is rotated counterclockwise by a driving device (not shown herein) from the saving position B to the effecting position A. Then, a free edge section of the push-out arm 94 engages with a periphery of the disk and pushes the disk to the front side. In association with movement of the disk, each of the arms 93, 92, and 91 is swung to the saving position B. And, when a front section of the disk is held between the roller 40 and a lower surface of the carriage 30, the disk is carried out to the insertion opening 5 due to a driving force of the roller 40.

Because of the guiding effect by these arms 91, 92, and 93 as well as of the automatically centering effect by the roller 40 with the diameter at a central portion thereof in the axial direction smaller than that of the other portions (namely, having a tapered form), a disk can accurately be carried back and forth (in the Y-axial direction) without displacing in the right-and-left direction (in the X-axial direction).

The disk guiding/positioning device comprises the disk guiding/swinging arm 91, and positioning arms 92, 93, and is based on the tapered construction of the roller 40 with the outer diameter increasingly becoming larger in the direction from the center to the both edges.

Also a disk take-out device for taking out a disk to outside of the apparatus is formed with the push-out arm 94, roller 40, and other related portions.

It should be noted that the disk guiding/swinging arm 91 is swung to the saving position one when a disk is to be reproduced, which makes it possible for the carriage 30 to move. Namely, when a disk is to be reproduced, if the carriage 30 is moved backward, the rotary ring 30d engaged from outside with the engagement pin 30c projecting downward from a bottom surface of the carriage 30 engages with a peripheral section 91c of the swinging arm 91 to swing the swinging arm 91 counterclockwise in association with backward movement of the carriage 30, so that the erecting engagement piece 91b of the swinging arm 91 will not contact a bottom surface and a side face of the carriage 30.

For the reasons components can be minimized by a height of the erecting engagement piece 91b of the swinging arm 91, which makes it possible to make smaller a thickness of the apparatus, thus size reduction of the apparatus in turn being enabled.

Next description is made for a clamping device 100 for clamping a disk with a turn table when the disk is to be reproduced.

Figure 29:
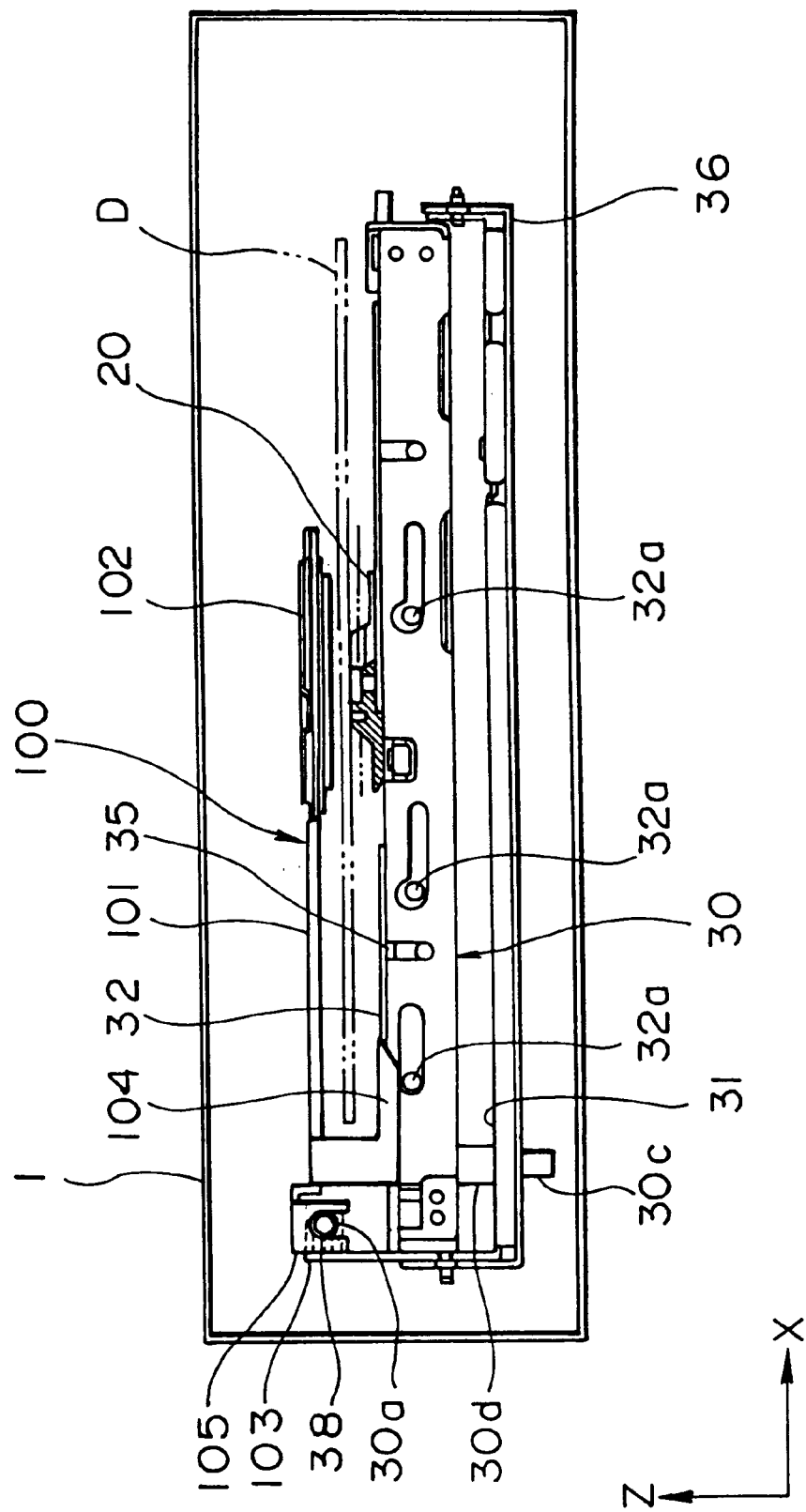
FIG. 29 is a front view showing a clamping device according to the present invention.

As shown in FIG. 29, the clamping device 100 is above the carriage 30 so that it can freely swing in the vertical direction. Namely A U-shaped pivotally supporting section 103 positioned at an edge section of the clamper arm 101 is pivotally attached to an outer periphery of the guide shaft inserting member 30a engaged from the outside with the guide shaft 38, and a a clamper 102 pressing a disk is rotatably inserted into a free edge section thereof. Also an L-shaped engagement piece 104 hangs down from a portion of the cramp arm 101, and the clamper arm 101 is urged by a spring so that it can move downward and a lower flat surface section of this engagement piece 104 will contact the pin 32a of the slide plate 32 when a disk is not being reproduced.

In this state, the carriage 30 is carried to the position for reproduction and a reproducing device such as the turn table 20 or the like is moved upward to carry a disk, the pin 32a planted in the slide plate 32 moves in the X-axial direction with the engaging position changed from a flat section of the locking piece 104 to the tapered section, and the clamper arm is swung downward (to a surface of the disk) because of the energizing force of the spring 105, thus the disk being pressed by the clamper 102.

When an operation for playing back the disk is finished, the turn table 20 and other related sections are moved downward. At the same time the pin 32a moves in a direction reverse to the X-axial direction and engages with a lower flat surface of the locking piece to swing the clamper arm 101 upward against the energizing force of the spring, this clamp being released.

There is thus provided a clamping device for clamping a disk together with the turn table 20 comprising the clamper arm 101, clamper 102, locking piece 104, and pin 32a.

Next description is made for a locking device for locking the main chassis against the housing 1 in the state where the carriage 30 is positioned at the stand-by position and a disk is not being reproduced.

Figure 30:
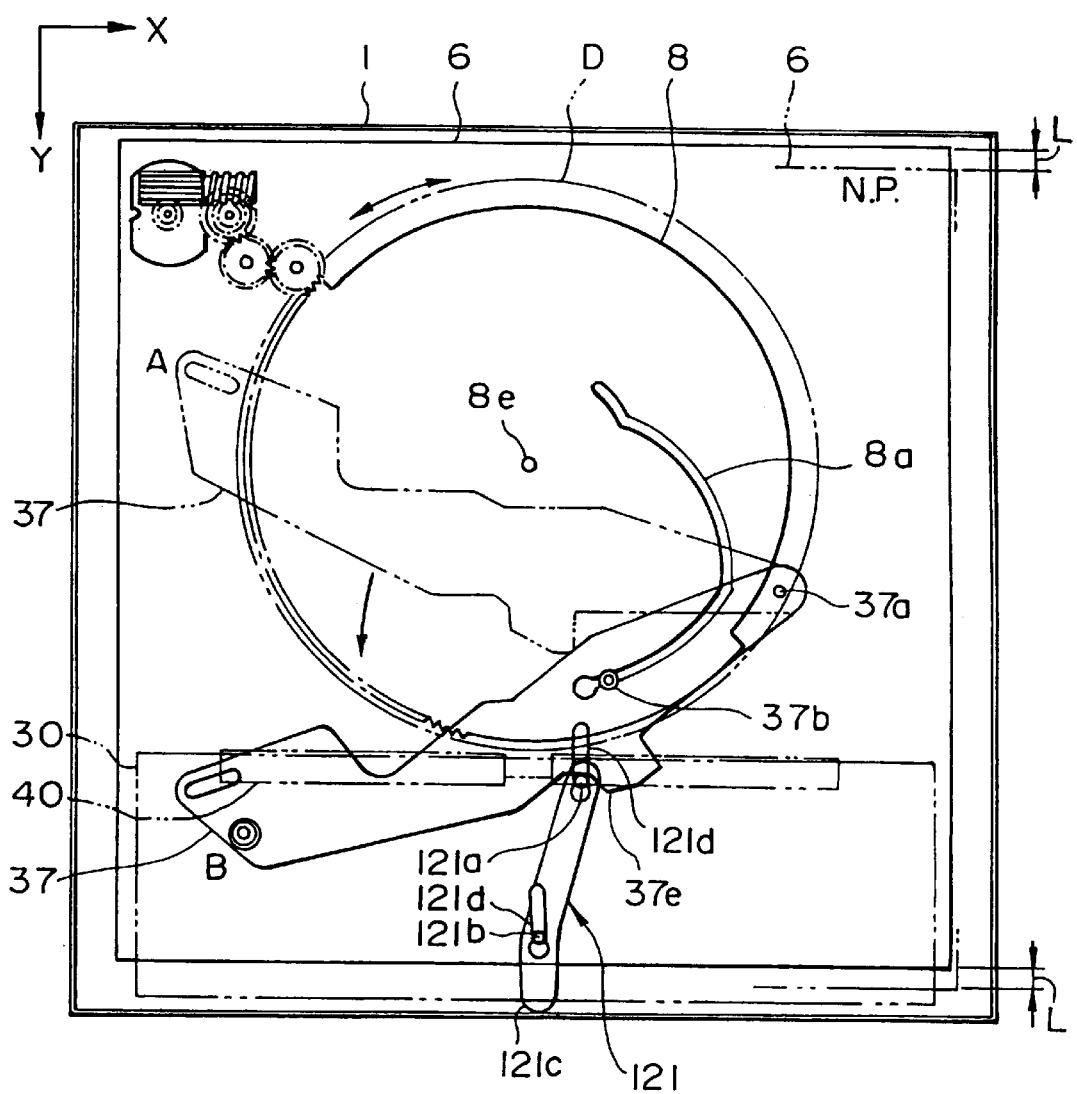
FIG. 30 is a flat view showing a locking device according to the present invention.

As shown in FIG. 30, a lock lever 121, which is long in the back-and-forth direction (in the Y-axial direction) is positioned on a bottom surface (on an outer surface of the bottom) with pins 121a, 121b planted on this lever 121 engaged in guide long holes 121d formed on the main chassis respectively, and so that it can reciprocally move back and forth and also can be urged by a spring backward (to the depth).

Also the pin 121a of the lock lever 121 extends and projects upward so that it can be engaged with a cam section 37e of the swinging arm 37.

On the other hand, the main chassis 6 is supported with supporting members such as rubber pieces (Refer to FIG. 2) (This position is called a neutral position (N.P) hereinafter).

When the swing arm 37 is swung in association with counterclockwise rotation of the cam gear 8 from this neutral position, namely the position A corresponding to the state where the carriage 30 is at the reproduction position, to the position B corresponding to the state where the carriage 30 is at the stand-by position in the front side, the cam section 37e formed at a substantially central portion in the front side of the swing arm 37 engages with the pin 121a to make the lock lever 121 project frontwards from a front edge of the main chassis, and the edge section 121c contacts an inner side wall of the housing 1.

When the lock lever 121 contacts the housing 1, the supporting members such as cushion rubber pieces are forcefully deformed in the back-and-forth direction, and the main chassis 6 is moved backward relatively against the housing 1 by a specified distance (to the depth).

With this operation, the main chassis 6 is urged in a direction against the housing 1, and the locking effect can be obtained because of the energizing effect as described above.

Also, when the main chassis 6 is moved relatively backward, a space is secured between a front edge of the main chassis 6 and a front wall of the housing 1, and the carriage 30 can be moved into this space (so that it projects frontwards from the main chassis 6).

For the reasons as described above, as compared to the construction in which a constant space for cushioning is always secured between the main chassis 6 and the housing 1, in the construction not requiring cushioning like that in the present embodiment in which a portion of the apparatus is set in the stand-by posture making use of the space when a disk is not being played back, depth of the apparatus can be made smaller by the dimension L, which enables size reduction of the apparatus.

It should be noted that, timing for starting or terminating each of the various steps described above is started or finished is detected by a detection sensor (not shown herein) for detecting the timing through contact with a moving member or in a non-contact form.

Next description is made for operations of the disk reproducing apparatus according to the present embodiment.

At first, when power for the apparatus is OFF and operation of the apparatus is down, the carriage 30 is positioned at the stand-by position at a specified height in the insertion opening side (Refer to FIG. 3).

In this state, when the power is turned ON and the disk carry-in mode is specified, at first whether any disk is present there or not is checked. In the operation for checking presence of a disk as descried above, at first an operation for moving a disk up to a specified position with the take-out device, then presence of a disk with a photosensor provided at a specified position is executed, and then an operation for accommodating a disk again is executed. These operations are repeated to all the trays. Then, if any empty tray is detected in the operation for checking presence of a disk, the empty tray 53 is positioned to a specified height by the lifting device 80, when the roller 40 in rotated in the carry-in direction enabling insertion of a disk. When a plurality of disks are to be inserted, the operation for inserting a disk is executed continuously according to a desired instructed operation or each time the instruction is issued.

When the operation for inserting or carrying a disk in as described above is finished, system control shifts to the reproduction mode according to a specified instruction. When an operation for selecting a desired disk is executed, the tray carrying thereon the disk is positioned at a specified height by the lifting device 80, and is separated from other trays by the tray separating device and is positioned at the specified height.

Then the cam gear 8 is rotated clockwise by the driving device 70. In association with rotation of the cam gear 8, at first the slide plate 61 is moved backward due to the effect by the second cam groove 8b, and at the same time the levers 63, 64, 65 each for separating a tray are moved forward or backward to separate a tray carrying thereon a disk to be reproduced is separated from the other trays.

Simultaneously when the tray is separated from the other trays as described above, the driving lever 110 is moved backward due to the effect by the engagement piece 8f with the cam plate 36 moved backward and the carriage carrier frame 31 moved downward, thus the carriage 30 being positioned at a specified height.

When the cam gear 8 is rotated further, the swinging arm 37 is swung backward due to the effect by the first cam groove 8a. At the same time the carriage 30 is moved from the stand-by position to the position for playing back a disk. In association with the backward movement of the swinging arm 37, locking by the lock lever 121 is released, and the main chassis returns to a neutral position where it is supported in the cushioned state.

Simultaneously when the carriage 30 reaches the reproduction position, the U-shaped engagement piece 32d on the carriage 30 is engaged with the engagement pin 39d on the slide lever 39.

When the cam gear 8 rotates further, the slide lever 39 is moved in a direction reverse to the direction X due to the effect by the third cam groove 8c, at the same time the slide plate 20 moves to raise the reproducing device carrier frame 35, and the turn table 20 raises a selected disk upward to carry it thereon. In synchronism to the upward movement of the reproducing device carrier frame 35, engagement between the locking piece 104 of the clamper arm 101 and the pin 32a is released, and the clamper arm 101 is swung downward because of the energizing force of the spring 105 to press the selected disk toward the turn table 20. Also in correlation to movement of the slide lever 39, the lower columnar member 131 is raised by a specified distance due to the effect by a correlating device as well as a cam device (both not shown herein), and the upper edge contacts a lower surface of the carriage 30 at the reproduction position (Refer to FIG. 3) to lock the carriage 30.

With the operation above, preparation for playing back a disk is complete, and now the disk is reproduced.

When reproduction of the disk is finished and the reproducing device returns to the stand-by position, a sequence reverse to that described above is followed, so that description thereof is omitted herein.

In a case where a disk accommodated in the disk holding device 50 is taken out, when the take-out mode is selected, a tray carrying thereon the selected disk to be taken out is positioned by the lifting device at a specified height, then the take-out arm 94 is rotated clock counterclockwise by a driving device and the take-out device 94 moves a disk forward by a specified distance, a front edge section of the disk goes into a space between the roller 40 and a lower surface of the carriage 30, and the disk is carried out due to a rotative force of the roller 4.

As described above, in the disk reproducing apparatus according to the present invention, a reproducing device which reciprocally moves in a direction perpendicular to a direction in which disks are arrayed and is positioned at the reproduction position between trays when a disk is to be reproduced or at the stand-by position off from an outer periphery of a disk when the disk is not being reproduced, and a roller for carrying a disk are positioned in the direction in which disks are arrayed when the disk is not being reproduced (in the stand-by position).

Accordingly, as compared to the construction in which the reproducing device and the roller are positioned in different areas respectively, a size of the apparatus in the front-to-rear direction can be made smaller.

Also in the disk reproducing apparatus according to the present invention, as a device for selecting and separating a disk to be reproduced from other disks, a wedge-shaped movable member which reciprocally moved in a direction crossing a direction in which disks are arrayed, it is possible to provide a selecting device with a simple construction, whereby the size of the apparatus can be minimized.

What is claimed is:

1. A disk reproducing apparatus in which a plurality of disks each carrying information recorded on a surface thereof, are inserted through an insertion opening and arrayed and held in said disk reproducing apparatus, whereby a desired disk can be selected for reproduction from said plurality of disks arrayed and held therein, said disk reproducing apparatus comprising:

a disk holding device including a plurality of trays for holding thereon said plurality of disks respectively, trays in said holding device being stacked in a predetermined direction which is substantially perpendicular to information bearing surfaces of said disks;

a disk carrying device which is operable to carry said disk between said insertion opening and said trays and is movable in said predetermined direction of the stack of disks; and a disk reproducing device including a turntable for rotating a disk which is being reproduced, said disk reproducing device being movable in said predetermined direction of the stack of disks, and can also be transported between a first position which is outside an area occupied by a disk held by said disk holding device when said disk is not being reproduced, and a second position in which at least a portion of said disk reproducing device is inside the area occupied by the disk when the disk is being reproduced;

wherein said disk carrying device and said disk reproducing device are juxtaposed in said predetermined direction of the stack of disks, when said disk is not being reproduced.

2. A disk reproducing apparatus as claimed in claim 1, wherein said disk carrying device has a roller which faces, in said predetermined direction of the stack of disks, a surface of a carriage for carrying thereon said disk reproducing device and transporting it in the direction in which the disks are stacked when a disk is not being reproduced.

3. A disk reproducing apparatus as claimed in claim 1, wherein said disk carrying device and said disk reproducing device are movable in tandem in said predetermined direction in cooperation with movement of said disk reproducing device from said first position to said second position.

4. A disk reproducing apparatus as claimed in claim 3, wherein said disk reproducing device is positioned above said disk carrying device, and wherein said disk reproducing device and said disk carrying device are shifted downwards when reproducing a selected disk, and said disk reproducing device and said disk carrying device are shifted upwards when a disk is to be carried through said insertion opening.

* * * * *